(12) United States Patent
Hardie-Bick

(10) Patent No.: US 7,411,581 B2
(45) Date of Patent: Aug. 12, 2008

(54) TOUCH PAD

(75) Inventor: Anthony Richard Hardie-Bick, London (GB)

(73) Assignee: SoundTouch Limited, Whitstable, Kent (GB)

( * ) Notice: Subject to any disclaimer, the term of this patent is extended or adjusted under 35 U.S.C. 154(b) by 145 days.

(21) Appl. No.: 10/502,969

(22) PCT Filed: Feb. 5, 2003

(86) PCT No.: PCT/GB03/00515

§ 371 (c)(1),
(2), (4) Date: Jul. 29, 2004

(87) PCT Pub. No.: WO03/067511

PCT Pub. Date: Aug. 14, 2003

(65) Prior Publication Data

US 2005/0083313 A1    Apr. 21, 2005

(30) Foreign Application Priority Data

| Feb. 6, 2002 | (GB) | ................................. 0202772.0 |
| Oct. 29, 2002 | (GB) | ................................. 0225107.2 |
| Nov. 2, 2002 | (GB) | ................................. 0225573.5 |
| Nov. 7, 2002 | (GB) | ................................. 0226033.9 |
| Nov. 7, 2002 | (GB) | ................................. 0226037.0 |

(51) Int. Cl.
*H03M 11/00* (2006.01)

(52) U.S. Cl. ..................... 345/173; 345/177; 178/18.01; 178/18.04; 178/20.04; 341/34; 367/907

(58) Field of Classification Search ................. 345/173, 345/177; 178/18.01, 18.03, 18.04, 20.01, 178/20.04; 341/34; 367/140, 907

See application file for complete search history.

(56) References Cited

U.S. PATENT DOCUMENTS 4,317,227 A    2/1982    Skerlos (Continued)

FOREIGN PATENT DOCUMENTS

DE    30 27 923    2/1982

(Continued)

OTHER PUBLICATIONS

Patent Abstracts of Japan, vol. 2000, No. 02, Feb. 29, 2000, Ricoh Co. Ltd.

(Continued)

*Primary Examiner*—Bipin Shalwala
*Assistant Examiner*—Vincent E. Kovalick
(74) *Attorney, Agent, or Firm*—Richard M. Goldberg

(57) ABSTRACT

A touch pad (101) includes transducers (201-204) for receiving acoustic signals resulting from touch events, such as the continuous movement of a fingertip across the surface (105) of the touch pad. The acoustic signals are acquired at different transducer locations in the surface. Signals from different transducers are combined, preferably in antiphase, to improve signal characteristics. The transducer signals are supplied to a stereo analogue to digital converter (407). Phase differences (706) are obtained and compared (703) with phase difference profiles (607) of known location, in order to identify the location of the touch event. An index (606) is used to identify candidate locations to reduce the amount of processing. Interpolation (705) is used to locate the touch event between profile locations.

20 Claims, 20 Drawing Sheets

U.S. PATENT DOCUMENTS

| | | | |
|---|---|---|---|
| 4,592,034 A * | 5/1986 | Sachse et al. | 367/127 |
| 4,644,100 A | 2/1987 | Brenner et al. | |
| 4,880,665 A * | 11/1989 | Adler et al. | 427/126.3 |
| 5,059,959 A * | 10/1991 | Barry | 345/168 |
| 5,194,852 A | 3/1993 | More et al. | |
| 5,404,458 A | 4/1995 | Zetts | |
| 5,412,189 A | 5/1995 | Cragun | |
| 5,591,945 A * | 1/1997 | Kent | 178/18.04 |
| 5,628,031 A | 5/1997 | Kikinis et al. | |
| 5,638,093 A | 6/1997 | Takahashi et al. | |
| 5,691,959 A | 11/1997 | Kriewall et al. | |
| 5,717,432 A | 2/1998 | Miwa et al. | |
| 5,856,820 A | 1/1999 | Weigers et al. | |
| 5,986,224 A * | 11/1999 | Kent | 178/18.04 |
| 6,161,434 A | 12/2000 | Fink et al. | |
| 6,167,165 A | 12/2000 | Gallagher et al. | |
| 6,392,167 B1 | 5/2002 | Nakagawa | |
| 6,404,353 B1 | 6/2002 | Coni et al. | |
| 6,535,147 B1 * | 3/2003 | Masters et al. | 341/34 |
| 6,549,193 B1 | 4/2003 | Huang et al. | |
| 6,555,235 B1 | 4/2003 | Aufderheide et al. | |
| 6,723,929 B2 | 4/2004 | Kent | |
| 6,724,373 B1 | 4/2004 | O'Neill, Jr. et al. | |
| 6,738,051 B2 | 5/2004 | Boyd et al. | |
| 6,741,237 B1 * | 5/2004 | Benard et al. | 345/173 |
| 6,922,642 B2 | 7/2005 | Sullivan | |
| 7,049,960 B2 | 5/2006 | Waltermann | |
| 7,116,315 B2 | 10/2006 | Sharp et al. | |
| 2001/0006006 A1 | 7/2001 | Hill | |
| 2002/0050983 A1* | 5/2002 | Liu et al. | 345/173 |
| 2003/0066692 A1 | 4/2003 | Devige et al. | |
| 2003/0217873 A1 | 11/2003 | Paradiso et al. | |
| 2005/0134574 A1* | 6/2005 | Hill | 345/173 |

FOREIGN PATENT DOCUMENTS

| | | |
|---|---|---|
| DE | 41 43 364 | 9/1993 |
| EP | 0 474 232 | 3/1992 |
| FR | 2595744 A1 | 9/1987 |
| FR | 2757659 | 6/1998 |
| FR | 2811107 | 1/2002 |
| GB | 2301217 | 11/1996 |
| JP | 11-327772 | 11/1999 |
| WO | WO99/38149 | 7/1999 |
| WO | WO 01/43063 | 6/2001 |
| WO | WO 01/048684 | 7/2001 |
| WO | WO 03/005292 | 1/2003 |

OTHER PUBLICATIONS

Fink, M., "Time-Reversed Acoustics,", 1999, Scientific American, Nov. 1999, pp. 91-97.

Ing, R.K. et al. Dynamic Foucusing Using a Unique Transducer and Time Reversal Process, 2001, The 8th International Congress on Sound and Vibration, Jul. 2-6, 2001, Hong Kong.

Ing, R.K. et al. "Time-Reversed Lamb Waves," 1998, IEEE Transactions on Ultrasonics, Ferroelectrics, and Frequency Control, vol. 45, pp. 1032-1043.

Ing, R.K. et al. Ultrasonic Imaging Using Spatial-Temporal Matched Field (STMF) Processing-Applications to Liquid & Solid Waveguides, 2001, IEEE Transactions on Ultrasonic..

McLaughlin, E.A. et al. Engineering Acoustics: Computational Acoustics, Ultrasonics and Applications, May 2004, Jour. Acoust. Soc. Am., v. 115, pp. 2587-2589 (abs 5aEA9..

Quieffin, N. et al. "Real time beam steering using a one channel time reversal mirror coupled to a solid cavity,", Mar. 2004, 2 pp.

Quieffin, N., et al., "Real-time focusing using an ultrasonic one channel time-reversal mirror coupled to a solid cavity,", May 2004, Jour. Acoust. Soc. Am., vol. 115, 6 pp.

Wilson, P.S. et al, Physical Acoustics: General Linear Acoustics, , Dec. 2002, Jour. Acoust. Soc. Am., vol. 112, pp. 2413-2415 (abstract 5aPA3, Real time ..).

Draeger et al, 1999, "One-channel time-reversal in Chaotic Cavities: Experimental Results," J. Accoust. Soc. Am. 105(2):618-625.

Kim et al, 2004, "Echo-to-reverberation Enhancement using a Time Reversal Mirror," J. Accoust. Soc. Am. 115(4): 1525-1531.

* cited by examiner

INDEX TEST 1  1301

| FEATURE | FREQUENCY | PHASE |
|---|---|---|
| 1 — 1306 | 52 | 78 |
| 2 | 102 | 23 |
| 3 | 1307  189 | 1308  100 |
| 4 | 207 | -50 |

INDEX TEST 2  1302

| FEATURE | FREQUENCY | PHASE |
|---|---|---|
| 1 | 38 | 38 |
| 2 | 57 | 3 |
| 3 | 79 | -30 |
| 4 | 102 | -152 |

INDEX TEST 64  1303

| FEATURE | FREQUENCY | PHASE |
|---|---|---|
| 1 | 41 | -100 |
| 2 | 95 | -126 |
| 3 | 109 | -10 |
| 4 | 235 | 13 |

LOCATION GROUP SCORES FOR TEST 1 — 1304, 1305

LOCATION GROUP SCORES FOR TEST 1  1305

| GROUP | SCORE |
|---|---|
| 1 | 0.29 |
| 2 | -0.1 |
| 3  1310 | 0.1 |
| 4 | 0.21 |
| 5 | 0.123 |
| 6 | 0.21 |
| 7 | -0.78 |
| 8 | -0.89 |
| 9 | -0.32 |
| . | . |
| 103 | 0.34 |
| 104 | 0.67 |
| 105 | -0.64 |
| 106 | 0.9 |
| 107 | -0.1 |
| 108 | -0.32 |
| 109 | -0.104 |
| 110 | -0.9 |
| . | . |
| 610 | 0.82 |

1309

TOUCH PAD

FIELD OF THE INVENTION

The present invention relates to a touch pad for navigating a graphical user interface. In particular, the present invention relates to an acoustic touch pad, and a method for processing acoustic signals resulting from touch events in order to identify the location of a touch event.

INTRODUCTION TO THE INVENTION

The mouse, keyboard and monitor combination of the desktop computer has provided computer operators with the ability to perform complex data manipulations without needing to be aware of underlying operations. While this interface is not perfect, the success of the personal computer is largely due to this particular method of operating a computer.

It is inconvenient to operate a laptop computer with a mouse, and so a touch pad is used. While most laptop users find this comfortable, it clearly imposes restrictions upon ease of use, as otherwise a percentage of desktop users would adopt such a device in preference to the mouse. The small area of laptop touch pads imposes restrictions upon the ease with which a detailed graphical user interface can be navigated. Compared to a mouse, such small area touch pads are ineffective because the relationship between finger movement and cursor is unnatural; laptop touch pads must apply considerable cursor acceleration in order to make useful navigation possible.

The size of the laptop touch pad is partly restricted by cost. However, a more fundamental restriction is that accidental touch points from fingers or other areas of the hand prevent a larger touch pad from operating. A larger touch pad would solve the problem of cursor movement, but known low cost touch pad technologies would be unable to operate if other fingers or parts of a hand were allowed to rest anywhere on the surface. The multiplexed resistive and capacitive methods employed in most laptop computers cannot provide a solution to these problems.

A large area touch pad that is tolerant of multiple point contact is disclosed in International Patent Application WO 9938149 A1. Products using this technology are produced by Fingerworks Inc., whose website is at http://www.fingerworks.com. Fingerworks provides a touch pad that has a large number of individually amplified proximity sensors to construct a proximity profile of a hand and fingers. Tracking software identifies gestures for cursor movement and click events. These touch pads are very expensive, due to the complexity of the sensor circuit.

Acoustic touch sensors are known that detect the location of a tap event on a surface. A finger tap location device is disclosed in European Patent Application EP 0474232 A2, and a stylus tap location device is disclosed in German Patent Application DE 3027923 A1. Both these disclosures use the same underlying principle. A tap on a surface generates an acoustic wavefront that moves radially away from the point of impact. An array of transducers embedded in the surface, or at its edges, receives the wavefront at different times. A pair of transducers provides a time delay of arrival (TDA), which defines a hyperbolic curve upon which the event must have occurred. A second pair of transducers provides a second time delay of arrival, thereby enabling the event to be located in two dimensions. At least three transducers are required to locate a tap event in two dimensions.

Movement of a cursor requires there to be a continuous acoustic interaction across a touch-receptive surface, enabling a continuous update of cursor location on the screen to be performed. Wavefront detection techniques cannot be used to detect continuous movement of a fingertip across a surface. Signal processing methods are known for obtaining time delay of arrival from a continuous signal. U.S. Pat. No. 5,465,302 discloses a method for locating continuous acoustic signals. In the method, a linear relationship between spectrum phase and time delay of arrival is identified, thus enabling two pairs of microphones to be used to identify the location of a person speaking in a room. However, this acoustic environment is relatively ideal, and the amount of echo and reverberation in such environments is not high enough to degrade the accuracy of speaker location. However, the sound received at a transducer in a touch pad is predominantly the result of many acoustic paths due to edge reflections and other effects. This complexity destroys the linear relationship between spectrum phase and sound source location that could otherwise be exploited to locate the source of a continuous sound.

A stylus-operated acoustic detection system is disclosed in German Patent Application DE 4143364 A1. In this system, a stylus is moved across a rippled surface. A natural resonance of the stylus combines with the waveform generated by movement across the ripples to produce sidebands. Acoustic signals containing the sidebands are received by transducers in the edges of the surface, and processed to provide velocity information for the stylus. The amplitude of the acoustic signals provides a rough estimate of location, which, in combination with the velocity and knowledge of the alignment of the ripples, can be used to facilitate continuous tracking of the stylus. The use of ripples in the surface requires that a stylus be used, so this technique cannot be used for tracking a moving fingertip.

In International Patent Application WO 01/43063 A1 by the present applicant, a method and apparatus are disclosed in which the friction resulting from the movement of a finger across a surface generates a continuous acoustic signal. This continuous friction noise is acquired by transducers embedded in the surface, and processed to identify the fingertip location. Spectral amplitudes are examined to identify the proximity of the touch event to a transducer. A plurality of such proximity readings is generated for respective transducers, and the location of the moving fingertip is thereby resolved in two dimensions. However, spectral amplitudes are dependent upon several characteristics, of which location is only one, thereby restricting the accuracy of cursor navigation.

SUMMARY OF THE INVENTION

It is an aim of the present invention to provide an improved apparatus for controlling cursor movement in response to acoustic signals generated by finger movement.

According to a first aspect of the invention there is provided a touch pad for acquiring acoustic signals resulting from touch events, comprising a surface having an area in which touch events may be formed, transducers for acquiring the acoustic signals at a plurality of different locations in the surface and an output connector for supplying representations of the acoustic signals to an analogue to digital converter. A plurality of the transducers is configured so as to electrically combine acoustic signals from a plurality of the different locations into a combined signal for the output connector. Preferably a plurality of the transducers are connected together in antiphase so as to electrically combine preferred components of the acoustic signals.

According to a second aspect of the invention there is provided an input control device for inputting data into a computer system, having a surface for receiving touch events and generating acoustic signals from a touch event, and transducers for acquiring the said acoustic signals at a plurality of different locations in the surface. The input control device further comprises analogue to digital converting means for digitising representations of the acoustic signals, processing means for processing the digitised acoustic signals, instruction storage means for storing instructions for the processing means, data storage means for storing intermediate data generated by said processing means, and calibration storage means for storing calibration data associated with said surface. The instructions stored in the instruction storage means include instruction code sequences executable on the processing means to perform the steps of (a) acquiring digitised acoustic signals from the analogue to digital converting means, (b) extracting phase difference information from a pair of said digitised acoustic signals, (c) locating a touch event by processing the phase difference information with reference to a calibrated relationship between the phase difference information and respective known locations and (d) supplying input signals to a computer system in response to the location of a touch event.

According to a third aspect of the invention there is provided a method for acquiring and processing acoustic signals arising from an acoustic interaction between an object and a surface, the method comprising the operations of (a) acquiring the said acoustic signals at a plurality of locations in said surface, (b) extracting phase difference information from the acoustic signals and (c) locating the acoustic interaction on the basis of comparisons between the phase difference information and a plurality of phase difference profiles whose respective locations are known. Preferably operation (c) includes sub-operations of (c1) processing said phase difference information with an index to identify candidate locations and (c2) locating the acoustic interaction by further processing the phase difference information with phase difference profiles associated with said candidate locations.

According to a fourth aspect of the invention there is provided a method for navigating a graphical user interface in response to acoustic signals generated by an acoustic interaction between a finger and a surface, the method comprising the operations of (a) acquiring the said acoustic signals at a plurality of locations in the surface (b) extracting phase difference information from a pair of said acoustic signals (c) locating the said acoustic interaction by processing said phase difference information with reference to a calibrated relationship between phase difference characteristics and respective locations and (d) updating the graphical user interface in response to the location of the acoustic interaction.

According to a fifth aspect of the invention there is provided a method for calibrating an acoustic touch pad by acquiring and processing acoustic signals resulting from sound supplied to the touch pad at selected locations on the surface of said touch pad, said method comprising repeated operations of (a) selecting a location for calibration, (b) supplying a sound to said surface at said selected location, (c) acquiring the said acoustic signals from a plurality of transducers in the surface, (d) extracting a location-related profile from the said acoustic signals and (e) storing the location-related profile in association with the selected location. Preferably a finalising operation (f) is performed comprising repeated operations of (f1) classifying locations in terms of the similarity of their respective location-related profiles, and (f2) generating an index entry from which candidate locations can be identified in response to location-related information.

According to a sixth aspect of the invention a computer readable medium is provided having program instructions encoded upon it for processing acoustic signals resulting from user touch events formed on the surface of a touch pad by executing the steps of (a) acquiring digitised forms of said acoustic signals from an analogue to digital converting means, (b) extracting phase difference information from a pair of the digitised acoustic signals, and (c) locating a said user touch event in two-dimensions of the surface by processing said phase difference information with reference to a calibrated relationship between said phase difference information and respective known locations.

According to a seventh aspect of the invention a computer readable medium is provided having a data structure encoded upon it that represents calibration data for an acoustic touch pad, in which the data structure defines (a) relationships between location-related profiles and respective known locations on the touch pad and (b) an index for candidate locations.

BRIEF DESCRIPTION OF THE DRAWINGS

The invention will now be described by way of example only with reference to the accompanying drawings, in which:

FIG. 13 details the index shown in FIG. 6;

DETAILED DESCRIPTION OF THE PREFERRED EMBODIMENT

Figure 1:
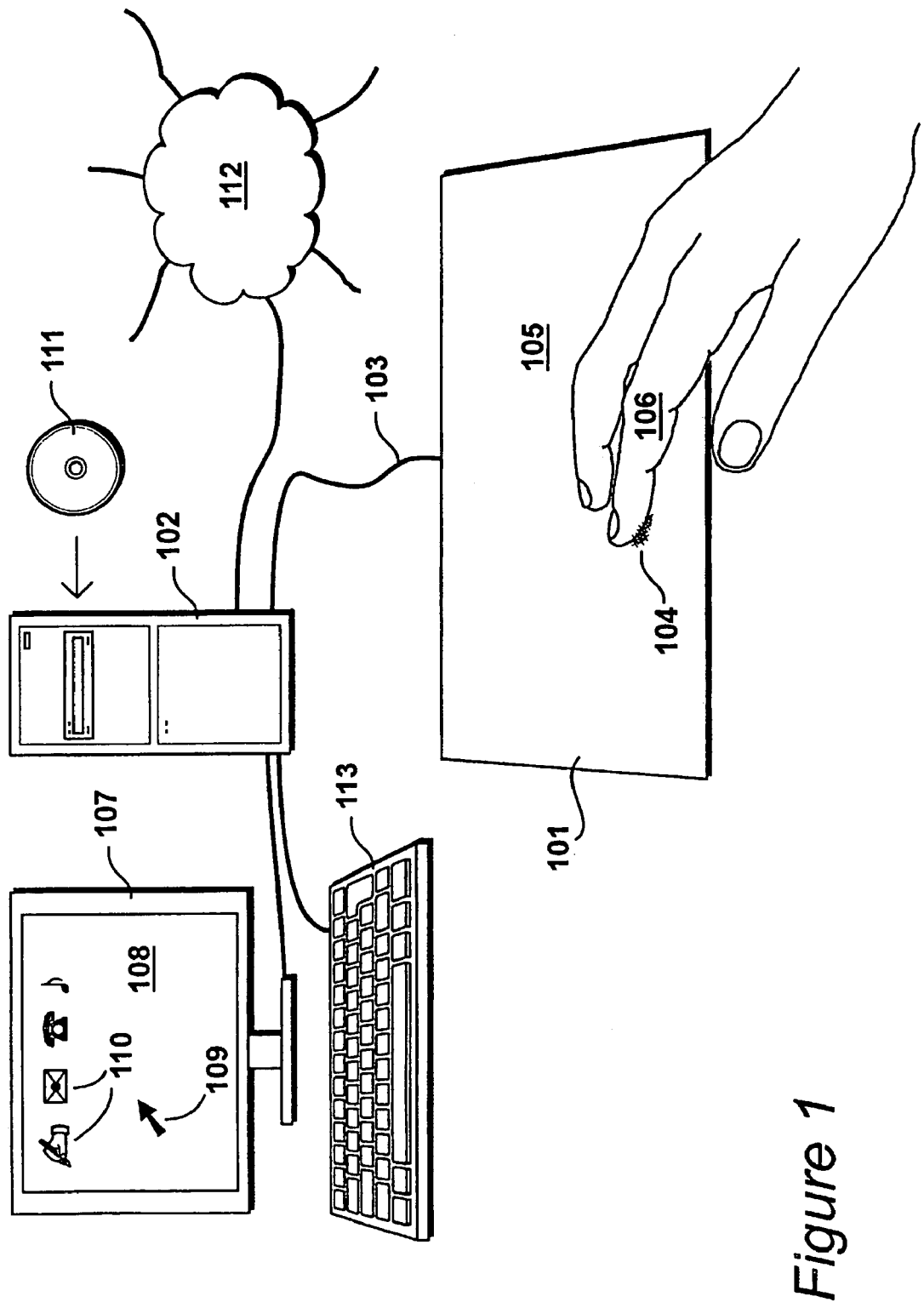
FIG. 1 shows a computer system, including a touch pad, a computer, a monitor, a CDROM containing a touch pad driver and a network over which a touch pad driver may be transmitted.

A personal computer system is shown in FIG. 1. A touch pad 101 supplies signals to a computer 102 via a connecting cable 103. Signals from the touch pad 101 are generated in response to touch events 104 made on the surface 105 of the touch pad 101. Touch events include continuous movement of a fingertip 106 across the surface of the touch pad 101 and the tapping of a finger on the surface of the touch pad. The computer 102 supplies image signals to a monitor 107, thereby enabling the monitor 107 to display a graphical user interface 108 including a cursor 109 and icons 110. Instructions provided on a CDROM 111 or via the Internet 112 enable the computer to interpret signals from the touch pad thereby enabling a user to navigate the graphical user interface 108 displayed on the monitor 107. A keyboard 113 supplies additional alphanumeric input to the computer 102.

The touch pad 101 receives two types of touch events. A first type of touch event is the sliding movement of a fingertip across the surface 105 of the touch pad 101. Such movement is interpreted by the computer 102 to result in movement of the cursor 109 in the graphical user interface 108 displayed on the monitor 107. A second type of touch event is a tap of the fingertip 106 against the surface 105. When the cursor 109 is located over an icon 110, a single tap is interpreted by the computer as a request to activate a process associated with that icon. Other types of tap interpretation are possible, such as double tap, as well as taps made in particular areas of the touch pad surface 105. In this way, a range of pointer-device activity required for navigating a graphical user interface is provided.

The touch pad 101 has an advantage over a mouse pointing device in that the mass of a mouse is absent, and muscular effort is required only for the movement of the finger 106. This results in a reduction in operator stress during prolonged computer use. A natural relationship exists between cursor and finger movement, because of the area of the touch pad is relatively large, at 230 mm wide by 180 mm deep, making the touch pad 101 shown in FIG. 1 considerably easier to use than the type of touch pad commonly found in a laptop computer.

Figure 2:
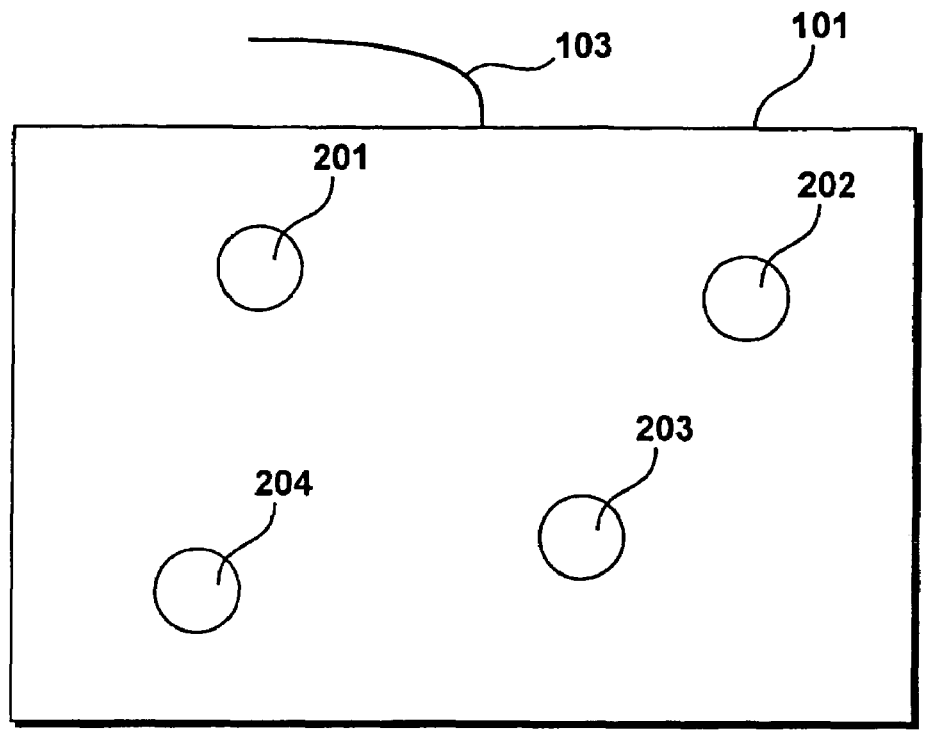
FIG. 2 details physical construction of the touch pad shown in FIG. 1.

The touch pad 101 shown in FIG. 1 is detailed in FIG. 2. The touch pad 101 contains four transducers 201, 202, 203 and 204. A touch event made on the surface of the touch pad 101 results in an acoustic interaction. Interaction between a finger 106 and the surface is acoustic in nature. Two different types of touch event may occur. In the first type of touch event, continuous movement of a fingertip across the surface of the touch pad 101 generates continuous noise. For clarification, the term "noise" is intended in this context to mean a broad spectrum of random sound. Similar sound is known as "white noise". Noise is generated as a result of friction between the surface and the moving finger, and shall hereinafter be referred to as "friction noise". A second type of touch event is short duration of sound resulting from a tap of a finger, or possibly another object, against the surface at a particular fixed location.

Both types of touch event, friction noise and tap, result in sound being transmitted through the surface 105 from the location of the touch event. The surface 105 is herein considered as comprising all those parts of the touch pad 101 that are significant in the transmission of sound waves resulting from touch events. The four transducers 201 to 204 pick up acoustic signals in different parts of the surface and convert these into electrical form. The electrical signals generated by the transducers are translated from sound waves into corresponding varying electrical potentials. Representations of these acoustic signals are supplied to the computer 102 via a connecting cable 103.

Figure 3:
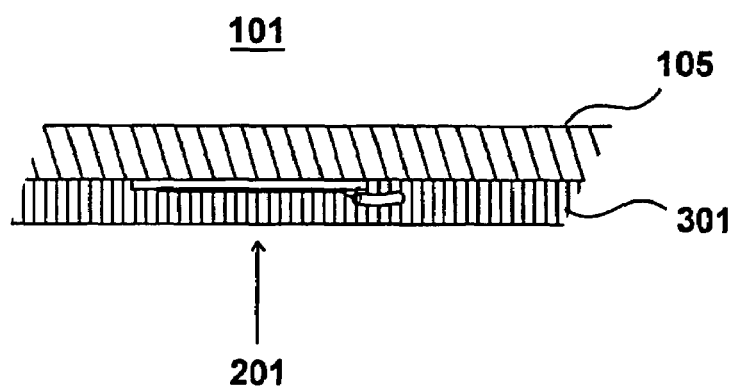
FIG. 3 shows a cross-sectional view of the touch pad shown in FIG. 1.

A cross sectional view of the touch pad 101 is shown in FIG. 3, including a transducer 201. The surface 105 is rigid and acoustically conductive, and made out of high density polyethylene. The top of the surface 105 is unpolished, so that movement of a fingertip 106 across the surface 105 generates friction noise. Materials such as polyethylene, nylon and fibreglass have a natural roughness, even in an apparently smooth surface, that facilitates generation of friction noise. In alternative embodiments, the surface can be made from a different high density material, including polymers such as nylon, and composite laminate materials such as fibreglass and Formica. Furthermore, the requirements for friction noise generation and acoustic transmission characteristics may conflict, in which case some embodiments may provide a top surface layer for the creation of friction noise, and a lower surface layer for acoustic conduction.

The transducer 201 is a piezo-electric transducer of the type commonly used for producing sound in digital watches. This type of transducer is extremely low cost and can be used as a contact microphone. The piezo transducers 201 to 204 are bonded to the underside of the surface 105 by a thin layer of hard adhesive. Sound pressure waves moving through the surface 105 pass through a transducer 201, producing a varying electrical potential in proportion to the distortion of the piezo-ceramic material in the transducer. Piezo-electric transducers have polarity. An upwards distortion of the transducer shown in cross section in FIG. 3 results in a positive electrical potential being developed across the transducer terminals. A downwards distortion of the transducer would then result in a negative potential being developed. The direction of polarisation of the piezo-ceramic material depends upon the direction of a polarising voltage that is applied during the process of transducer manufacture.

The base of the touch pad 101 is light foam rubber 301, that supports the touch pad surface 105 away from any acoustic interference, as well as providing a protective covering to the transducers 201 to 204 and their electrical connections.

Figure 4:
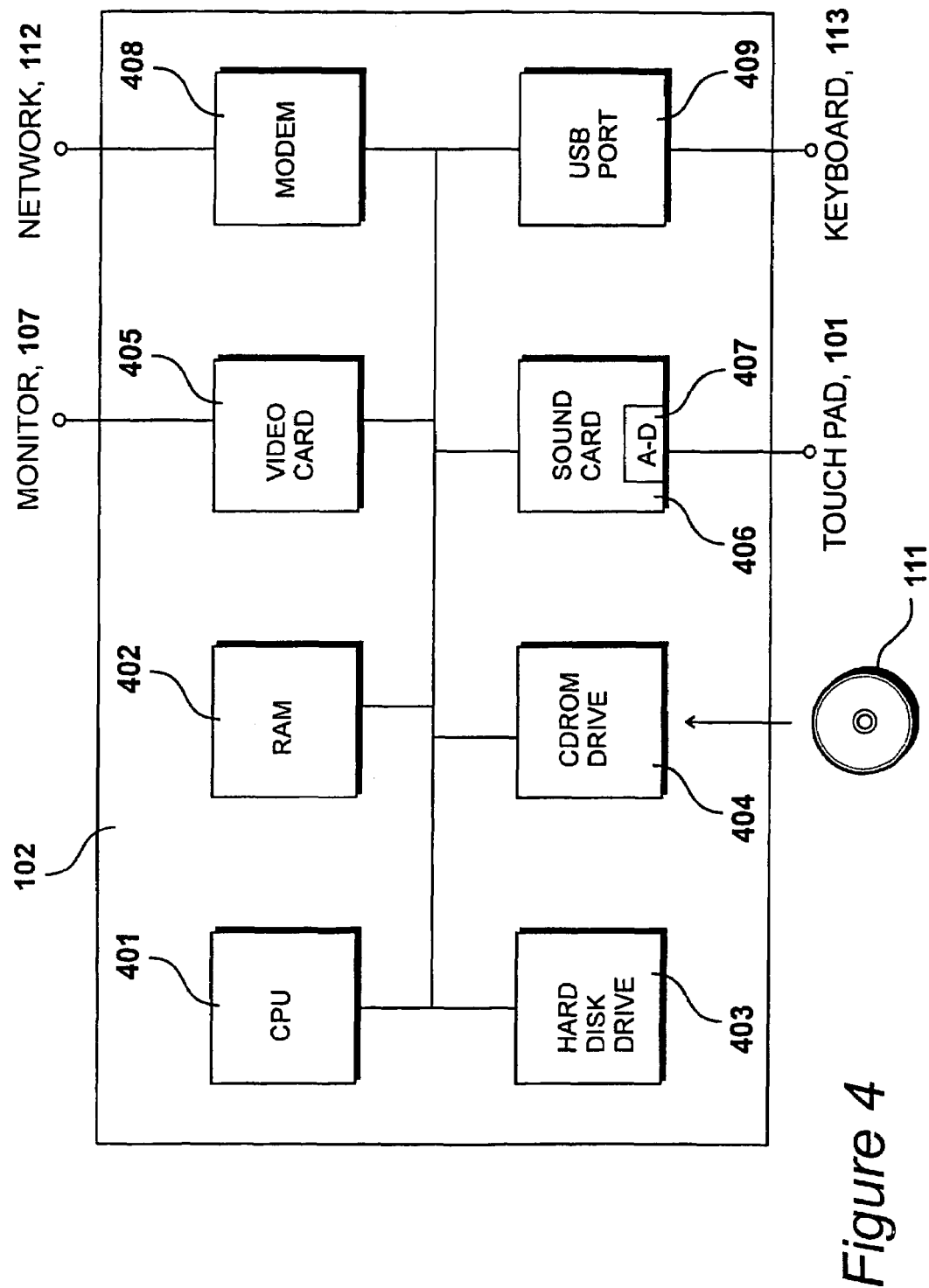
FIG. 4 details key components of the computer shown in FIG. 1, including a main memory.

The computer 102 shown in FIG. 1 is detailed in FIG. 4. A Pentium central processing unit (CPU) 401 executes instructions held in one hundred and twenty-eight megabytes of main memory (RAM) 402. The main memory 402 also stores data which the processor may manipulate according to its instructions. Both data and instructions are stored on a hard disk drive 403. The hard disk drive 403 retains its contents when the computer 102 is switched off, so contents of the main memory 402 are refreshed from the hard disk drive 403 when the computer is switched on. Instructions and or data may be installed onto the hard disk drive 403 from a variety of sources. A CDROM drive 404 reads CDROM, CDR or CDRW disks, including the CDROM 111.

A video card 405 receives instructions and data from the processor 401 to render images on the monitor 107, thereby providing the user with a graphical user interface 108 that can be navigated by touch events formed on the touch pad 101. The cursor 109 is the primary signifier of navigation in such an interface. However, it is also known to navigate three and higher dimension environments using two or less dimensions provided by a pointing device. The touch pad 101 can be used for this type of navigation also, which includes the navigation of three-dimensional computer-generated environments.

A sound card 406 receives signals from the touch pad 101. The sound card 406 has a stereo analogue to digital converter 407, and the transducers 201 to 204 are connected to the stereo microphone input of the sound card 406. The analogue to digital converter 407 in the sound card 406 is configured to operate at a sample rate of 44.1 kHz with sixteen bits of precision for each of the left and right stereo channels. The sound card 406 digitises incoming electrical signals from the touch pad 101, and makes these digitised acoustic signals available to the processor 401. During operation, the stream of samples is temporarily stored in main memory, awaiting a burst of processor activity during which touch events are interpreted to update the user interface 108. This process of acquiring, storing, processing and updating is performed continuously with no apparent delay, so that movement of the user's fingertip 106 across the surface 105 of the touch pad 101 results in a substantially continuous movement of the cursor 109 on the monitor 107. Other aspects of the user interface 108 may also be updated substantially continuously in response to user fingertip movements.

A modem 408 provides connectivity to the Internet 112. The keyboard 113 is connected to a Universal Serial Bus (USB) port 409. The components 401 to 409 of the computer 102 are standard components of an ordinary personal computer.

Figure 5:
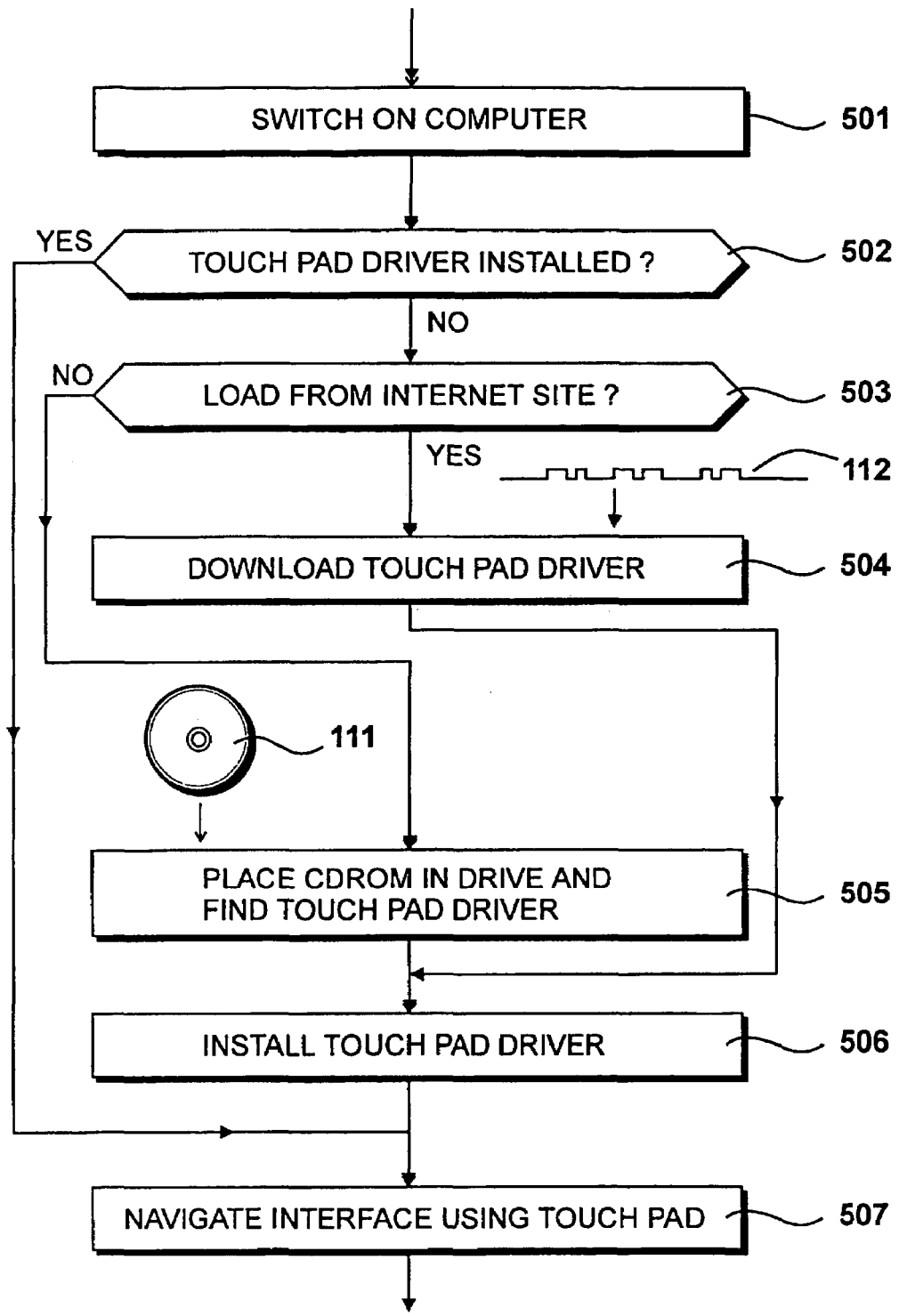
FIG. 5 details steps performed by an operator of the computer shown in FIG. 1 in order to perform installation of the touch pad driver from CDROM or the Internet shown in FIG. 1.

Instructions for interpreting touch pad signals also require data representing calibrated touch pad characteristics. This combination of instructions and data for interpreting touch pad signals forms a touch pad driver. The touch pad driver may be stored in volatile memory 402, non-volatile memory 403, 111 or transmitted over a network 112. Touch pad operation requires that the touch pad driver is installed on the computer 112. A flowchart summarising user operations to install and operate the driver for the touch pad 101 are shown in FIG. 5. At step 501 the user switches on the computer. At step 502, a question is asked as to whether a touch pad driver is already installed. If so, control is directed to step 507, where the user may start to navigate the graphical user interface 108 immediately. Alternatively, control is directed to step 503, where a question is asked as to whether the touch pad driver is to be loaded from a site on the Internet 112. If not, control is directed to step 505.

The touch pad driver is downloaded via the Internet 112 at step 504. In this process, instructions and data for interpreting touch pad signals are transmitted from a remote site on the Internet 112, via the modem 408 to the main memory 402 and the hard disk drive 403 of the computer 102. The instructions and data are transmitted in an electrical medium as an encoded stream of varying electrical potentials. During transmission over the Internet, the instructions and data may also be encoded as serial or parallel signals and transmitted through optical fibre or an electromagnetic radio or microwave medium. The modem 408 constructs parallel signals of eight bits from the received serial stream, and these are supplied to the processor 401, which performs additional decoding steps, including data decompression, so as to reconstruct the driver instructions and data. The touch pad driver may exist in several computer-readable forms: as intermediate serial data encoded upon a computer-readable medium such as the Internet or other network; as intermediate parallel compressed data stored temporarily in the main memory 402 or hard disk 403 of a computer 102, or as a decoded executable set of instructions with associated data that is ready for installation or execution upon a computer with which a touch pad 101 is intended for use. It is further possible that a touch pad driver may be presented to a computer in a format that is only useful with an additional enabling sequence of codes that may be entered on the keyboard 113 or some other means of data entry.

As an alternative to installation via the Internet 112, the touch pad driver instructions and data are encoded upon the medium of the CDROM 111 as patterns of optical pits in an aluminum layer. At step 505 the user places the CDROM disk 111 into the CDROM drive 404 and the touch pad driver is located automatically. The CDROM drive 404 reads the pattern of pits on the CDROM 111, generating a serial stream of varying electrical potentials. Installation from the CDROM 111 results in conversion from the physical computer readable medium of the CDROM disk 111 into a serial stream of electrical pulses that are reconstructed as data, and stored in main memory 402. Instructions executing on the processor 401 perform data decompression in order to reconstruct the driver in a form that is installable on the computer 102.

At step 506 the touch pad driver is installed. The user initiates the installation process, resulting in installation instructions present on the computer's hard disk drive 403 being executed to install touch pad driver instructions and data. Once installed, the touch pad driver instructions are executed, and the touch pad driver thereafter exists as one of many processes that run automatically when the computer is switched on. At step 507 the user navigates the graphical user interface 108 using the touch pad 101. The touch pad driver is an enabling set of instructions and or data that, when installed upon an ordinary personal computer 102, enable that computer to perform steps for interpreting signals from the touch pad 101.

Operation of the computer to install the touch pad driver requires navigation of a computer interface. Since the touch pad 101 is not operative prior to installation of its associated driver instructions and data, navigation for the installation process may be performed using the keyboard 113.

Figure 6:
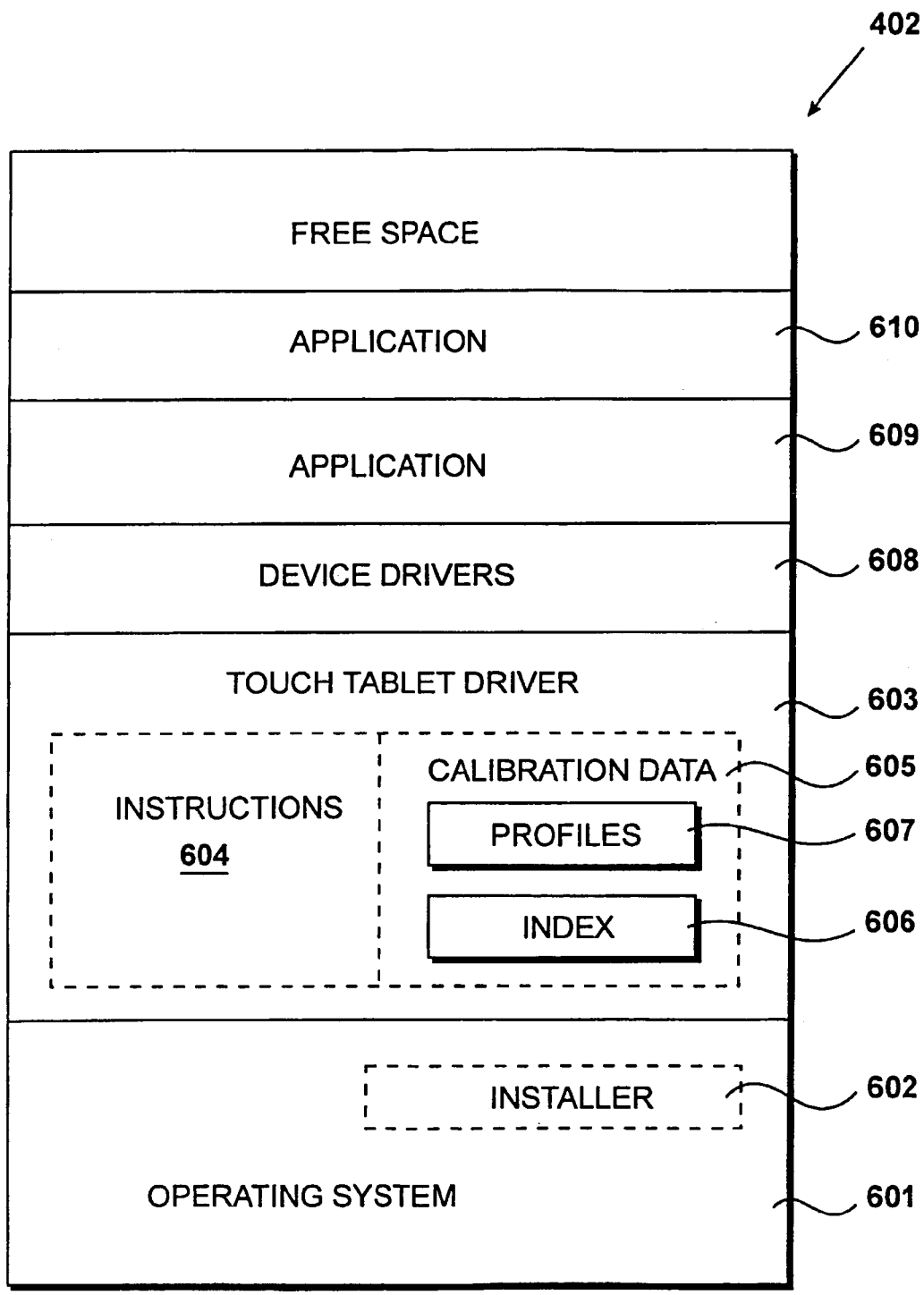
FIG. 6 details contents of the main memory shown in FIG. 4 after the installation performed in FIG. 5, including a touch pad driver including profiles and an index.

Once the computer 102 has been switched on and the touch pad driver has been installed, the main memory 402 may be summarised as comprising the components shown in FIG. 6. An operating system 601 includes instructions and data structures for enabling applications, such as a web browser, word processor, email client and so on, to execute on the computer and to interact with hardware components 402 to 407 of the computer without concern for their specific characteristics. For example, a pointing device such as a mouse may be replaced with a graphics tablet or touch pad. The operating system presents pointing device information to applications in a universal pointing device format, so that application developers know in advance that their program will work with many different kinds of pointing device. The touch pad driver enables the operating system to provide this kind of device abstraction, thus enabling the operating system to present the touch pad as a generalised "input control device" that may be used equally by all programs requiring graphical navigation of some kind.

The operating system 601 includes an application installer 602, which was used to perform the installation process initiated by the user at step 506 in FIG. 5. As a result of installation, touch pad instructions and data are stored on the hard disk drive 403 and also in main memory 402 as shown at 603. The touch tablet driver 603 includes instructions 604 and calibration data 605. The calibration data 605 includes an index 606 and location profiles 607. Other device drivers also reside in main memory, as shown at 608. Applications are shown at 609 and 610.

Figure 7:
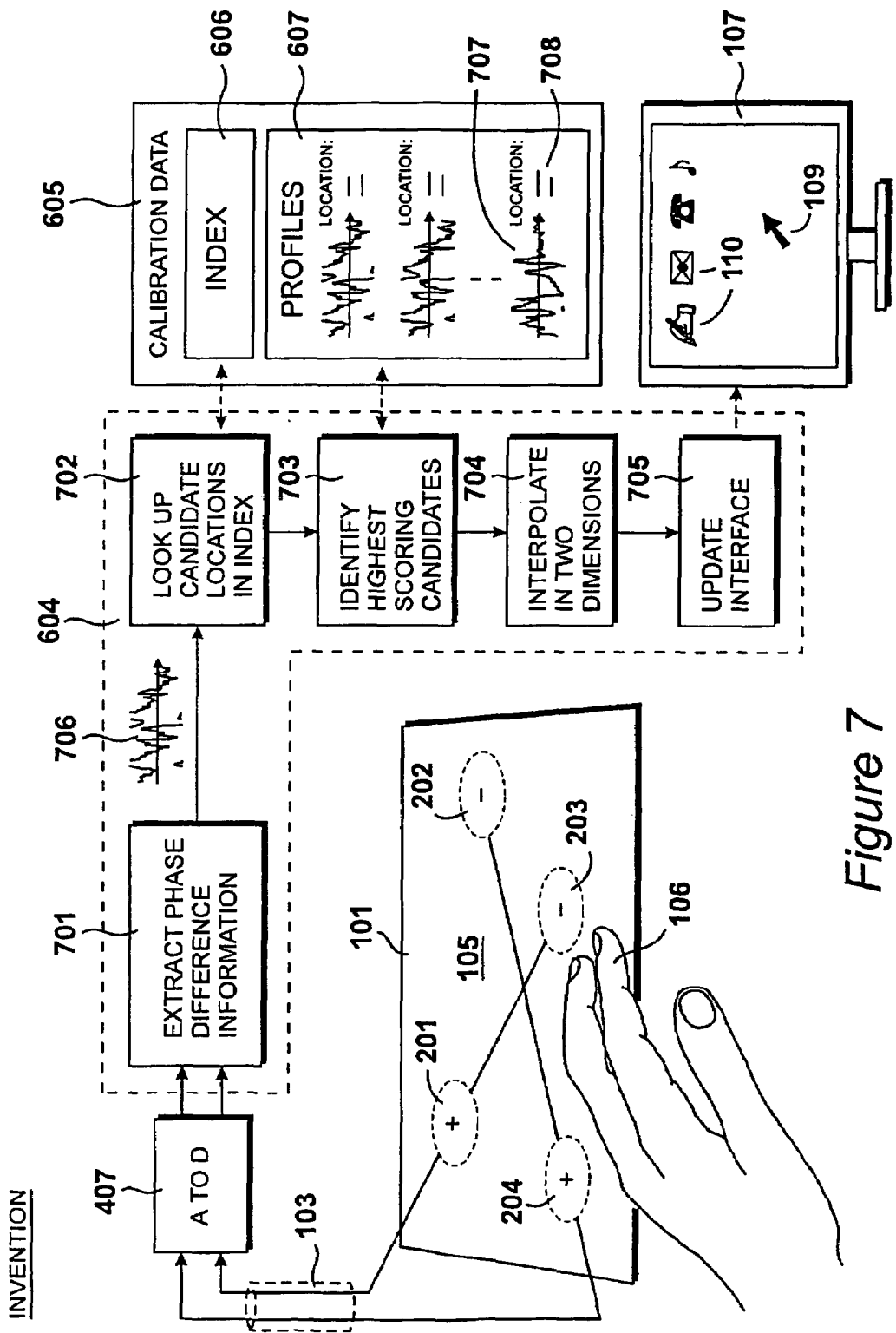
FIG. 7 shows the invention, including operations of extracting phase difference information, looking up candidate locations in an index and identifying highest scoring candidates, and calibration data including an index and phase difference profiles.

The invention is shown in FIG. 7. The touch pad 101 has a surface 105 upon which touch events are formed. Touch events cause an acoustic interaction between the surface 105 of the touch pad 101 and an object, such as the user's finger 106. Acoustic signals are generated as a result of an acoustic interaction of this kind, and these signals are acquired at transducer locations 201, 202, 203 and 204. The transducer locations are asymmetric. Acoustic signals from transducer locations 201 and 203 are combined electrically to form one of the two stereo channels supplied to the analogue to digital converter 407 in the sound card 406 of the computer 102. The other channel of the analogue to digital converter 407 is supplied by the electrical combination of signals from transducers 202 and 204. Connections 103 from the electrically combined transducers supply representations of the combined acoustic signals to the analogue to digital converter 407.

The combination of signals from multiple transducers 201, 203 and 202, 204 spread across the touch pad surface ensures that low level friction noise signals will be acquired at sufficient levels wherever they occur on the surface 105. The combination of transducer signals improves the accuracy of touch event location by increasing the signal strength. However, due to the asymmetry of the combined transducer locations, acoustic signal characteristics have higher complexity than acoustic signals acquired from individual locations on the surface. This substantially increases the ability of the touch pad driver to identify the location of a touch event.

Signals from transducers 201 and 203 are combined in antiphase, indicated by the plus (+) and minus (−) signs shown on the transducers in FIG. 7. Combination in antiphase has the effect of reducing the amplitude of low frequency components that are present at locations 201 and 203. The antiphase combination combines preferred high frequency components of the acoustic signals, while rejecting unwanted low frequency components. The same arrangement is provided for the wiring of transducers 202 and 204, so that both channels contain combinations of preferred components of the acoustic signals, while significantly excluding unwanted low frequencies. Removal of unwanted acoustic signal components enables the touch pad driver 603 to reliably detect, classify and locate different types of touch event.

Acoustic signals resulting from friction noise are low in amplitude, and the component frequencies of friction noise have a relatively equal amplitude across the spectrum. However, tap events generate acoustic signals of extremely high amplitude. The high amplitudes are concentrated mostly in the low frequency part of the spectrum. By reducing the amplitude of low frequencies, it is possible to avoid overloading the analogue to digital converter 407 during tap events. The low frequencies of high amplitude contribute minimal location information to the touch pad driver 603, and so they may be excluded without affecting the accuracy of touch event location. Use of an antiphase connection between transducers avoids the need for expensive conditioning circuitry that would otherwise be required in order to ensure that the analogue to digital converter 407 does not get overloaded by a tap event. Such overload would prevent a tap event from being correctly interpreted by the touch pad driver.

The touch pad driver instructions 604, when executed on the processor 401, result in operations 701 to 705. These operations process digitised acoustic signals supplied from the analogue to digital converter 407, and analyse them to identify the location of a touch event on the surface of the touch pad 101. Identification of the location of a tap event is known in the art, as shown in EP 0 474 232 A2 and DE 30 27 923 A1. However, the methods and apparatus disclosed in this prior art do not facilitate the continuous tracking of a moving fingertip, and are not directed towards this aim. A method for continuous acoustic tracking of a fingertip is disclosed in WO 01/43063 A1 by the present applicant. However, this does not disclose a touch pad apparatus or method capable of locating a touch event to a high-enough level of accuracy required for navigating a graphical user interface. Furthermore, in all of the prior art, at least three channels of analogue to digital conversion are required to resolve an acoustic event location in the two dimensions of a surface, making such apparatus considerably more expensive than the present invention. The use of only two channels of analogue to digital conversion makes it possible to connect the touch pad 101 directly to an ordinary computer, taking advantage of the standard provision of a low cost sound card having a stereo microphone input. The computer 102 is enabled for operation with the touch pad 101 by the installation of the touch pad driver 603.

The operations of the touch pad instructions 604 are shown in FIG. 7. The analogue to digital converter 407 generates two streams of samples, which may be considered as left and right channels, since they are ordinarily used to convey this information. In the operation 701 for extracting phase difference information, each of these channels is considered in groups of 512 samples, and the samples are processed by a windowing function, a Hanning window, in preparation for a fast fourier transform (FFT). The fast fourier transform analyses the audio samples into 256 frequencies, each defined by a complex number which defines information about the phase angle of each frequency component. Left and right fourier transformations are performed, resulting in a left-right pair of phase angles for each of 256 frequency components. Looked at in isolation, the 256 left channel phase angles are entirely random. This is also true of the right channel phase angles. However, when each of the 256 left angles is subtracted from its respective right channel phase angle, the result is a graph of phase difference information 706, which is related to the location of the touch event. This location-related information is used to identify the location of a touch event. Each location on the surface 105 has its own unique phase difference characteristic. This uniqueness is the result of the asymmetry of the transducer locations, and the fact that signals from different asymmetric locations are combined, thereby increasing complexity and ensuring that each possible surface location is well differentiated in terms of its respective phase difference characteristic.

The calibration data 605 for the touch pad 101 includes a large number of phase difference profiles 607, or location-related profiles 607. These accurately store phase difference characteristics calibrated at known locations on the surface of the touch pad 101. Each phase difference profile 707 has an associated location 708, which defines both x and y coordinates on the touch pad surface 105. The location of a touch event is defined in two dimensions by reference to phase difference profiles of known two-dimensional location. However, the number of such profile locations is very high, being in the order of several thousand. Comparing the phase difference information 706 with each such stored profile would require an excessive amount of processing to be performed.

The location of a touch event is identified by comparing phase difference information 706 with phase difference profiles 607 of known location. Because of the large number of profiles 607, an index is used to identify candidate locations before comparisons between the phase difference information 706 and profiles 607 are performed.

Having extracted the phase difference information 706 from the digitised acoustic signals, the next operation 702 performed by the touch pad driver is to look up candidate locations in the index 606. The indexing operation generates candidate locations, which are a subset of locations from the entire set of locations for which profiles are stored. From this short list of candidates, the next operation 703 identifies highest scoring candidate locations. This includes searching around previously identified candidate locations. In operation 703, similarity scores are generated for each possible candidate location, resulting in identification of a small number of high scoring profiles whose location is known.

The location of a touch event is calculated in operation 704. The similarity scores are used to determine an interpolation between respective profile locations, so as to identify the central location of a touch event, which is rarely coincident with the location of a calibrated profile.

Having identified the location of the touch event, the graphical user interface 108 is updated in operation 705.

When the touch event is the continuous movement of a finger across the surface 105, updating the interface is performed in the following way: The difference moved by the finger since the last measurement of its location is noted. The distance is scaled appropriately, and a corresponding pixel movement is added to the current position of the cursor 109. A command is then issued to the operating system to refresh the graphical user interface 108. This causes a differential movement of the cursor. The cursor is moved according to the difference between the previous fingertip position and the current fingertip position. Absolute cursor movement is also possible, where the dimensions of the touch pad 101 are mapped onto the dimensions of the screen, and the location of the cursor on the screen is in fixed relation to the location of the fingertip on the touch pad. However, this is not generally useful for cursor navigation.

When the touch event is a tap, it is interpreted as a left mouse button click event. This is convenient for most kinds of interface navigation, resulting in a point-and-tap paradigm that is inherently appealing. However, the mouse and other pointing devices have several buttons, at least some of which have important functions that must be provided by the touch pad 101. The right button click is achieved by tapping to the right of where the user last moved their fingertip. Other tap events can be provided with a similar level of control of the familiar range of mouse operations. Tap event location is necessary information for generating such context-sensitive tap events. Tap event locations are identified in the same way as finger movement events, as described for operations 701 to 704. A tap event is distinguished from a movement event by its duration and intensity, both of which are identified from an examination of the digitised acoustic signals supplied from the analogue to digital converter 407.

In summary, acoustic signals arising from touch events are acquired by the touch pad 101. Touch events are signified by an acoustic interaction between the touch pad 101 and an object 106. The touch pad 101 has an area 105 in which such touch events may be formed. Transducers acquire the acoustic signals at a plurality of different locations 201, 202, 203 and 204 in the surface 105. A connecting cable 103 supplies output signals that are representations of the said acoustic signals to an analogue to digital converter 407. A plurality of transducers 201, 203 is configured so as to electrically combine acoustic signals from a plurality of said different locations 201, 203 into a combined signal for said connecting cable 103. A second plurality of transducers 202, 204 is similarly configured. Combined transducers are connected in antiphase 201, 203 so as to electrically combine preferred components of the acquired acoustic signals, thereby avoiding potential analogue to digital converter overload during a tap event.

Having acquired acoustic signals from the touch pad surface 105, representations of the said acoustic signals are digitised 407, forming digitised acoustic signals. Phase difference information 706 is extracted from the acoustic signals by processing the digitised acoustic signals. The location of the touch event is identified on the basis of comparisons 703 between the phase difference information 706 and phase difference profiles 707 whose respective locations 708 are known. A subset of all possible locations for which profiles are stored is identified by processing the phase difference information 706 with an index 606 to identify candidate locations 702 whose respective profiles are then processed with the phase difference information 706 to identify the location of an acoustic interaction resulting from a touch event. In an alternative embodiment, the relationships between location-related profiles and their respective locations are stored, without explicit storage of the profiles and or the locations themselves. Interpolation 704 is used to refine the touch event location to a precision greater than that provided by the grid of profiles for which locations are known.

The touch pad driver 603 enables an ordinary personal computer to operate with the touch pad 101. The touch pad driver includes instructions 604 and calibration data 605. The instructions may be provided on a physical computer readable medium, or an a transient electrical or optical computer-readable medium such as a high speed network or the Internet 112. Instructions embodied in any such form therefore provide an ordinary computer with the enabling means to interpret signals from an acoustic touch pad, and to perform pointer actions including cursor movement. The data structures required for such usage, namely the location-related profiles 607 and an index 606 and or relationships between location-related profiles 707 and respective touch pad locations 708, are also required for operation of the touch pad 101, and these data structures may be encoded on a computer-readable medium such as a CDROM 111 or transmitted over a network 112 either with or without the touch pad driver instructions 604. It is advantageous for the user of the touch pad 101 to have the data 605 and the instructions 604 presented together on the same medium 111 or 112. In an alternate embodiment, the touch pad driver 603, or parts of it, are stored on a read only memory, and are accessed directly by a processor without intermediate storage in random access memory. That processor may be a digital signal processor configured supply signals to a computer system, that performs ordinary computer application and operating system processing.

Figure 8:
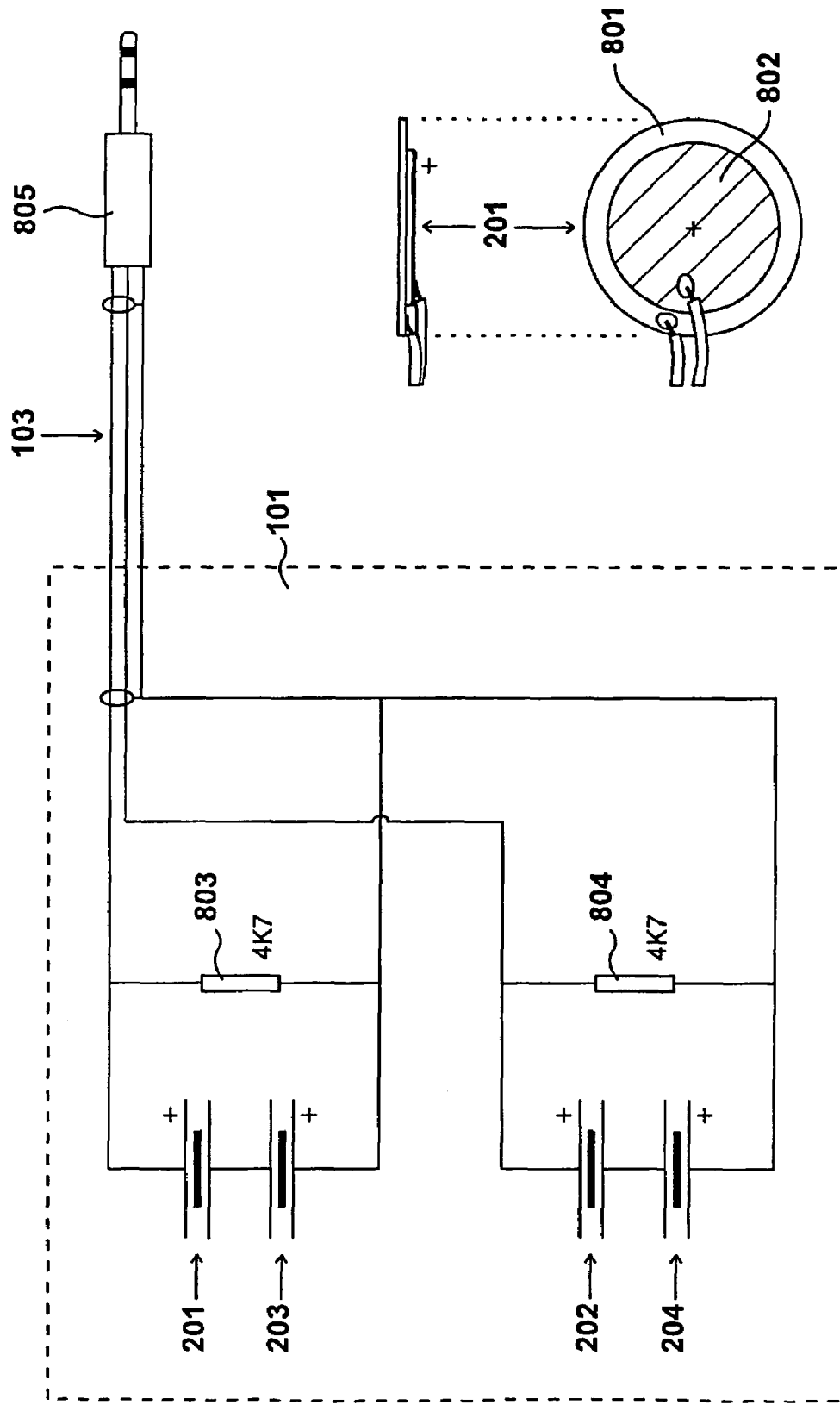
FIG. 8 shows the circuit details for the touch pad shown in FIG. 1.

The circuit diagram for the touch pad 101 is shown in FIG. 8. Each piezo-electric transducer 201 to 204 comprises a brass disc 801 upon which a piezo-ceramic layer 802 is deposited. A conductive metallic surface is deposited on the exposed piezo-ceramic material, and wires are soldered to the two conductive outer layers of the device. When the transducer is manufactured, a high voltage is applied to establish alignment of the crystalline structure in the piezo-ceramic material. The polarity of this voltage determines whether a concave or convex flexing of the transducer disk shall result in a positive or negative voltage being developed across its terminals. Concave flexing will be considered as an expansion of the brass plate side of the device. For convenience in the circuit description, the brass plate side will be considered as the negative terminal of the device.

In the circuit diagram, transducer pairs 201, 203 and 202, 204 are connected in series with their polarities reversed. This achieves an antiphase combination of their respective acoustic signals. The transducers could also be connected in parallel, but the series connection is preferred in order to supply a higher voltage signal to the analogue to digital converter 407. The antiphase arrangement reduces the amplitudes of low frequency components of the acoustic signals, because these components are in phase at most points on the touch pad surface 105. Further reduction of low frequencies is achieved by a single pole high pass filter formed by a resistor 803 in parallel with the transducers 201 and 203. The transducers have an intrinsic capacitance, which, in conjunction with the resistor, forms a high pass filter. A second resistor 804 is connected across transducers 202 and 204 to achieve the same high pass filtering effect. The high pass filters perform signal conditioning so as to emphasise preferred components of the acoustic signals. In an alternate embodiment a different signal conditioning circuit may be used, such as a passive inductive filter, an active filter or a compressor or limiting circuit. In the preferred embodiment, however, signal conditioning is achieved by the combination of the antiphase connection between transducers and the high pass filter implemented by the addition of a resistor across transducer outputs as shown in FIG. 8. The signals from the transducers are supplied to the output cable 103, which is terminated in a 3.5 mm stereo jack plug 805. The jack plug 805 connects directly to the stereo microphone input of the sound card 406.

Figure 9:
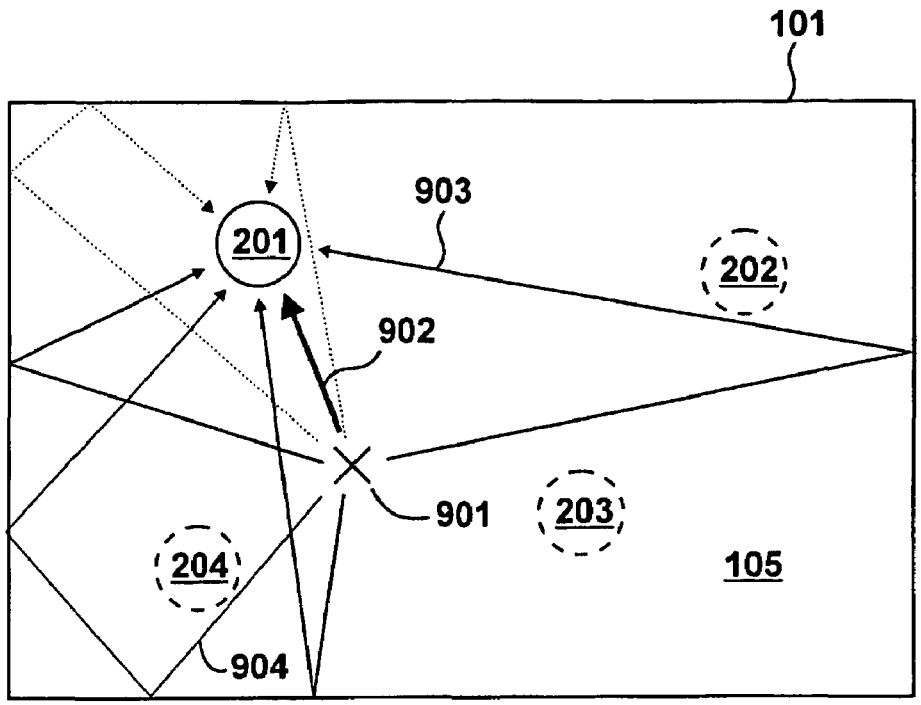
FIGS. 9 and 10 illustrate acoustic transmission paths on the touch pad shown in FIG. 1.
Figure 10:
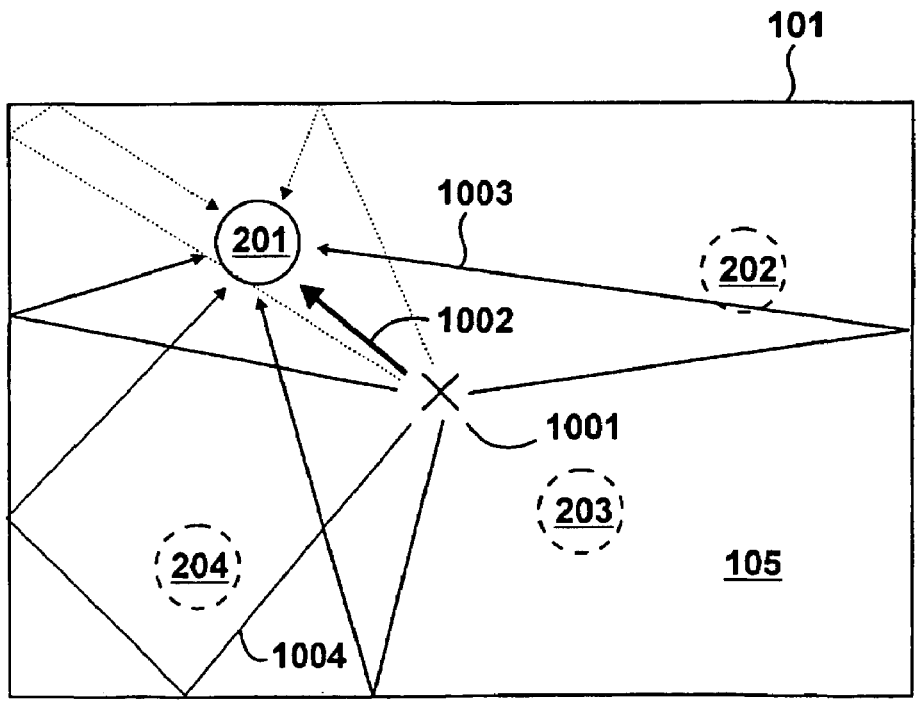

Characteristics of the acoustic signals are explained with reference to FIG. 9 and FIG. 10. In FIG. 9, a touch event 901 generates sound waves that spread out through the surface 105 of the touch pad 101. A few of these waves reach the transducer at location 201. A direct path 902 provides the loudest signal. Other paths 903 and 904 are indirect, and reflect once or several times from the edges of the touch pad 101. However, the indirect paths are numerous, and so their combined energy is greater than that of the single direct path 902. The acoustic signals transformed into electrical signals by the transducer at location 201 are therefore different from the sound at location of the touch event 901 itself. FIG. 10 shows a touch event at a slightly different location. Here the paths 1002, 1003, 1004 are of different length and have different amplitudes. The paths are generally longer, but their ratios are slightly different from those shown in FIG. 9. As a result, the transformation of the acoustic signal between its source, at 1001, and its destination is different from the transformation that occurs in FIG. 9. The transformation of the acoustic signal is location-dependent.

It is impossible to know the precise sound that occurs at the location of the touch event 901. Therefore, knowledge of the acoustic signals at transducer 201 cannot provide sufficient information to identify the location of a touch event 901. A different set of transformations is inherent in the acoustic signals generated by transducer 202. A comparison of the two transformed sets of acoustic signals does provide information related to the location of a touch event. In order to ensure that these relationships are unique to each possible location on the surface 105, the transducers are located asymmetrically. Furthermore, in order to increase the complexity of relationships, pairs of transducer outputs are combined. Transducers 201 and 203 are connected so as to electrically combine acoustic signals. Signals from transducers 202 and 204 are also combined in this way. The relationships between the combined transducer outputs provide an ideal level of complexity for identifying the touch event location. Having several transducers spread out over the surface has the added beneficial effect of ensuring that weak friction noise signals can be picked up well at all locations in the surface. Combined transducers 201, 203 are located diagonally from each other so as to ensure that any touch event location is as close as possible to transducers of both channels. Furthermore, by connecting the transducers in antiphase, preferred components of the acoustic signals are combined, while unwanted low frequency components are cancelled out or attenuated.

Figure 11:
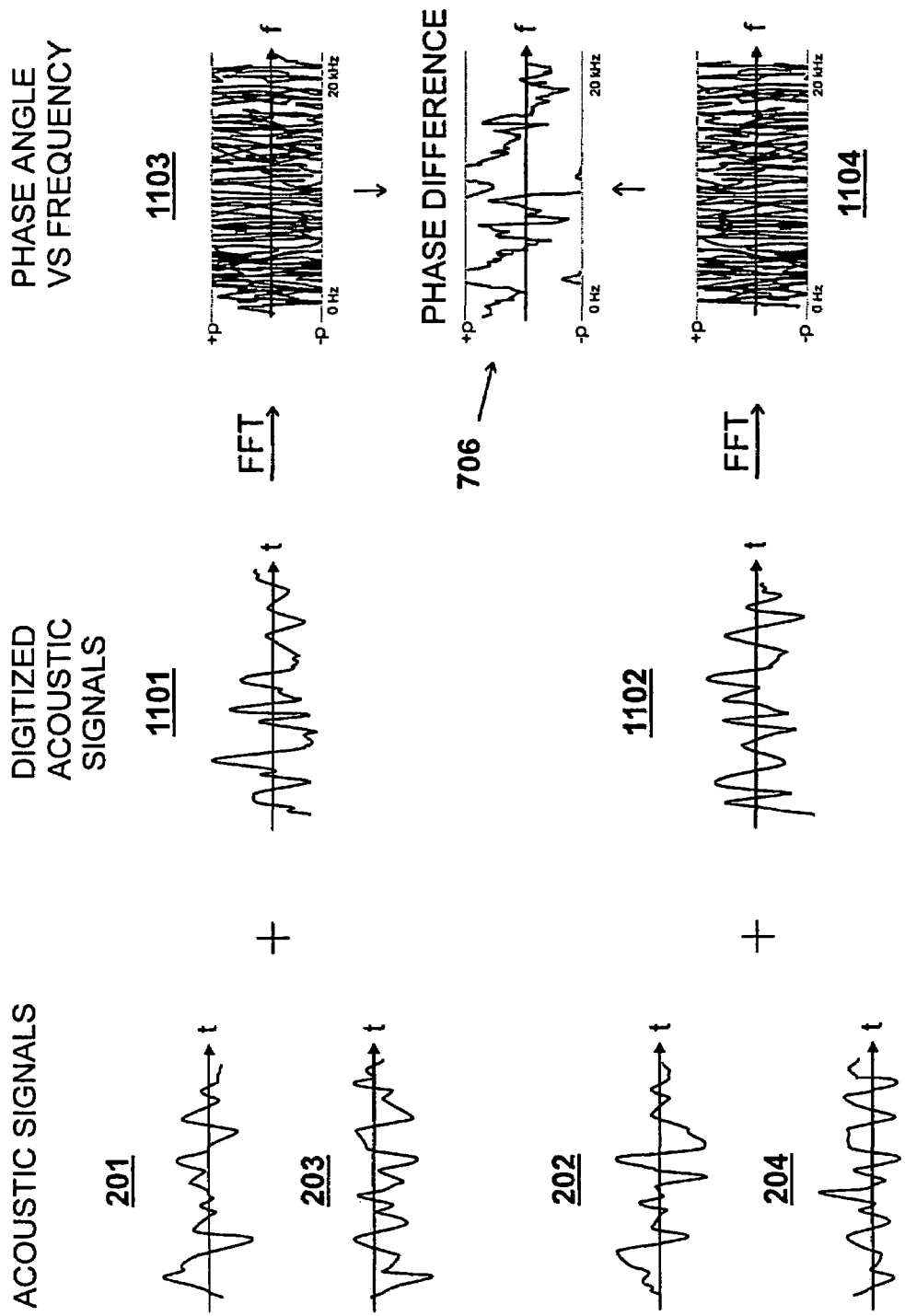
FIG. 11 details the operation of extracting phase difference information shown in FIG. 7.

Signals relating to touch event location are illustrated in FIG. 11. Acoustic signals at the transducers 201, 202, 203 and 204 are transformed into electrical analogue signals whose variation over time is illustrated by the graphs shown in FIG. 11. The signals from transducers 201 and 203 are combined electrically and supplied to the analogue to digital converter 407, resulting in left digitised acoustic signals 1101. Signals from transducers 202 and 204 are similarly digitised, resulting in right digitised acoustic signals 1102. Each of the left and right digitised acoustic signals is independently transformed, in operation 701, by a fast fourier transform (FFT). This generates independent phase angle information for left and right channels. The phase angle information comprises 256 frequencies each of which has a phase angle defined by a complex number having a real and an imaginary component.

For the purposes of the preferred embodiment, frequency amplitude information is discarded. However, in an alternative embodiment, phase difference information is represented by complex numbers that include amplitude information that is not discarded, and is used as an additional characteristic for locating a touch event or for other purposes.

The phase angle information of an individual channel is random, and conveys no useful information. Random phase angle graphs are shown at 1103, for the left channel, and 1104 for the right. Phase differences between respective phase angles are calculated by multiplying a complex number from one channel by the complex conjugate of the respective complex number from the other channel. The resulting complex number is converted into a phase angle. The resulting phase difference information 706 is unique to the touch event location on the surface 105. The graph of phase difference information generated from the transducer signals is noisy, but is sufficiently clear to enable it to be used in matching with profiles 707 whose locations 708 are known. In this way it is possible to identify the location of a touch event.

Figure 12:
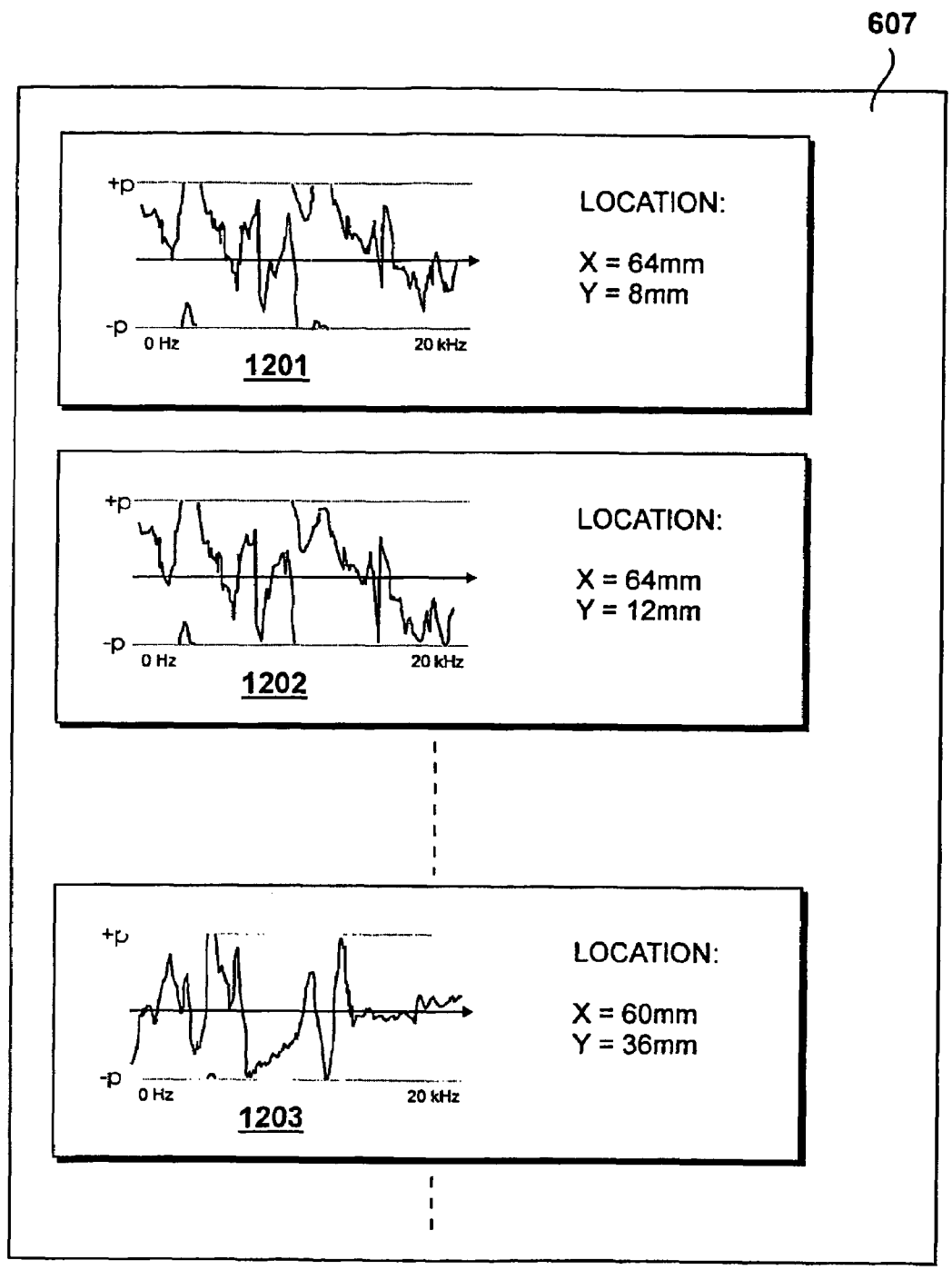
FIG. 12 details the phase difference profiles shown in FIG. 8.

Phase difference profiles 607 shown in FIG. 6 are detailed in FIG. 12. Each profile 1201, 1202, 1203 has an associated location. Neighbouring locations 1201, 1202 have similar profiles. The profile locations are spaced 4 mm apart from each other, in both dimensions of the touch pad surface 105.

The index 606 shown in FIG. 6 is detailed in FIG. 13. The index comprises a number of index tests 1301, 1302 and 1303. There is a total of sixty-four index tests. Each index test 1301 comprises two parts: a set of features 1304 and a set of location group scores 1305.

There are four features 1304 in each index test. Each feature 1306 has a frequency value 1307 and a phase angle value 1308. There are 256 frequencies in the phase difference information. The feature frequency 1307 specifies one of the 256 frequencies. The phase angle 1308 specifies the preferred value of the phase at that frequency. The phase values range from −128 to +127, which correspond to phase angles in the range −PI to +PI. An eight-bit integer representation is used for speed of processing. In combination, the four features specify preferred phase angle values at specified frequencies. A proportion of phase difference profiles 607 will match the feature set well. Coincidence between matching phase difference profiles 607 and phase difference information 706 that also matches the feature set, indicates a high probability that the phase difference profile closely matches the phase difference information. Applying all sixty-four index tests in this way results in set of probability scores for profile locations, enabling candidate locations to be identified.

The location group scores 1305 for index test 1 1301 are also detailed in FIG. 13. Calibrated locations are grouped together in groups of four. Features 1304 for the test are then compared with each of the four grouped locations and the average similarity score is stored in association with that group. There is a total of 610 location groups, resulting from a total of 2440 calibrated location profiles. Each group has its own index number 1309, from which the grouped locations may easily be identified by multiplying by four and adding 0, 1, 2 or 3. The associated score is expressed as a floating point value in the range −1 to +1. A score of zero indicates that the location group, on average, has no correlation with the features of the test. A negative score indicates a negative correlation, and a positive score 1310 indicates a positive correlation. Correlation is the measure of similarity between patterns.

Figure 14:
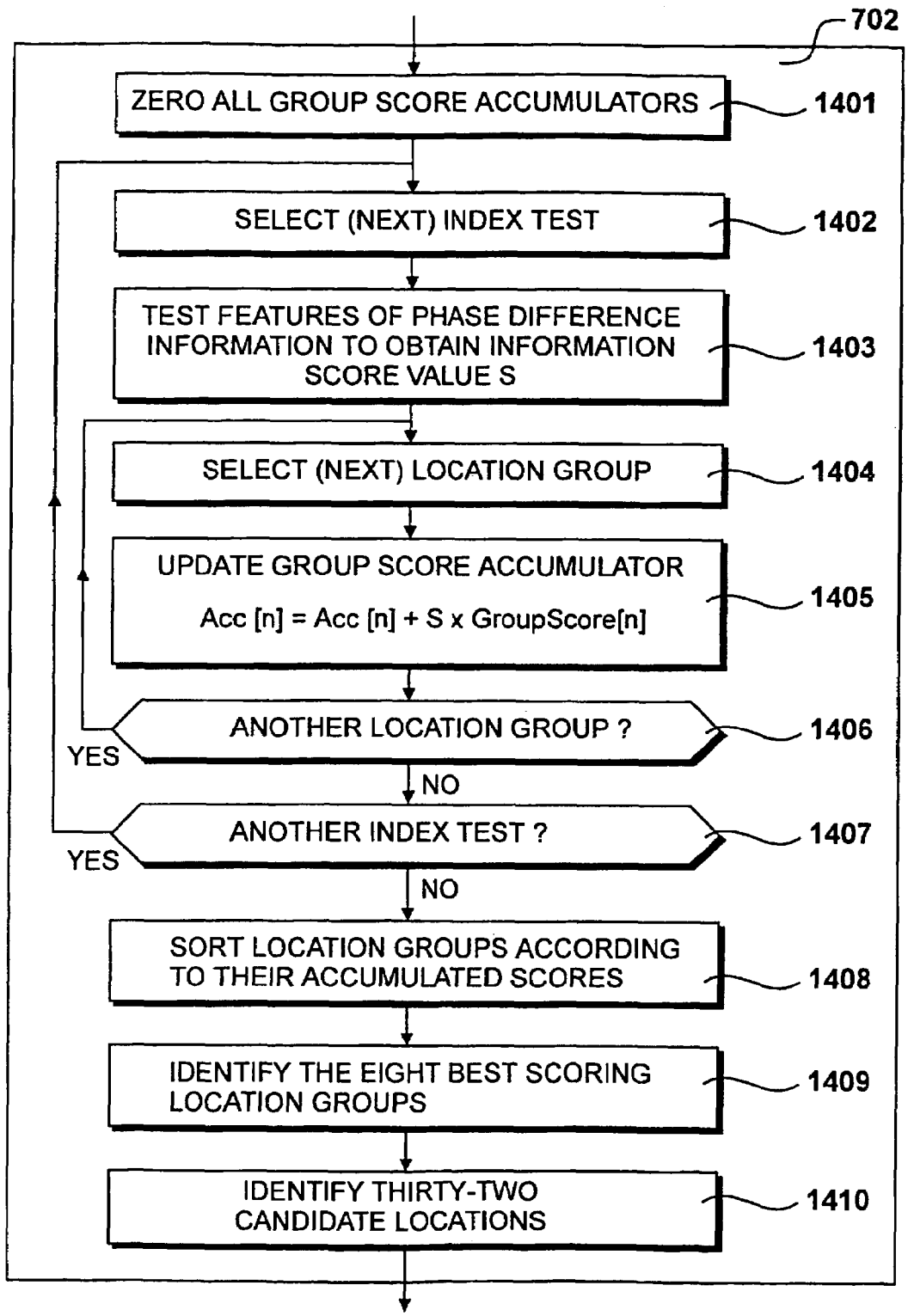
FIG. 14 details the operation of looking up candidate locations in an index shown in FIG. 7, including a step of testing features.

The operation 702 of looking up candidate locations in the index 606 shown in FIG. 7 is detailed in FIG. 14. At step 1401 a set of group score accumulators is set to zero. There are 610 group score accumulators—one for each location group. At step 1402 the first index test 1301 is selected. At step 1403 the features 1304 of the test are applied to the phase difference information in order to identify an information score value S. S is a measure of the similarity between the phase difference information 706 and the specified features of the test. Up to this point, the location group scores 1305 have not been consulted. At step 1404 the first location group 1309 is selected. At step 1405 the score accumulator for the group is updated by adding the product of the group score 1310 and S. If both of these are positive, this indicates a degree of similarity between the profiles of the grouped locations and the phase difference information 706. If both S and the group score are negative, this also indicates a degree of similarity, indicated by the product of these two negative values being positive. If S and the group score have different signs, this indicates a non-similarity between the phase difference information 706 and the profiles of the location group. The purpose of the indexing process is to gather information that results in the identification of profiles of known location having a strong similarity to the phase difference information 706. As the steps of FIG. 14 are repeated, the group score accumulators are updated at step 1405. At the end of the process, the highest scoring location groups are identified as the candidate locations.

At step 1406 a question is asked as to whether another location group is to be selected. If all 610 location groups have not been considered, control is directed back to step 1404. Alternatively, control is directed to step 1407, where a question is asked as to whether another index test can be selected. If so, control is directed back to step 1402. Alternatively, if all sixty-four index tests have been processed, control is directed to step 1408. At step 1408 the location groups are sorted into order according to their accumulated scores. At step 1409 the eight best scoring location groups are identified. At step 1410 the individual thirty-two candidate locations are identified from the indices of the location groups.

Figure 15:
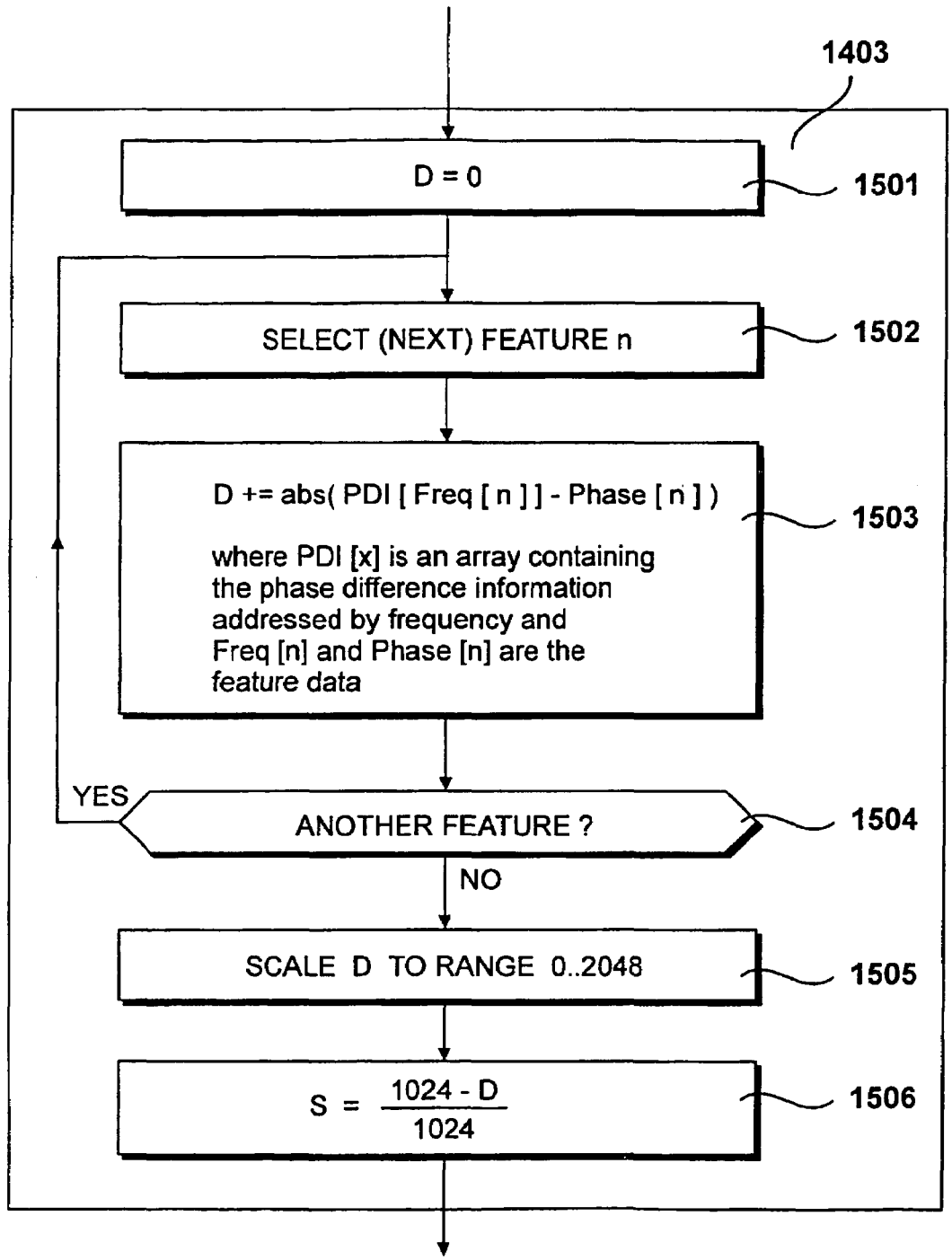
FIG. 15 details the step of testing features shown in FIG. 14.

The step 1403 of applying test features to the phase difference information to obtain the information score S is detailed in FIG. 15. At step 1501 a variable D is set to zero. At step 1502 the first feature is selected, and a variable n is set to indicate the feature number. At step 1503 the array of phase difference information, PDI, is indexed at the frequency 1307 specified by the current feature to identify the phase angle at that frequency in the phase difference information. This is indicated by the term PDI[Freq[n]]. The phase angle 1308, Phase[n], specified by the feature, is subtracted from this value, to provide a phase difference. Negative values are converted to positive, giving an absolute difference between the two phase angle values. A small difference indicates the phase difference information 706 matches the feature 1306 well.

At step 1504 a question is asked as to whether another feature is to be considered. If so, control is directed to step 1502, and step 1503 is repeated four times, once for each feature. After all features for the test have been processed, control is directed to steps 1505 and 1506, where the integer score D accumulated at step 1503 is re-ranged to provide a similarity score between −1 and +1.

Figure 16:
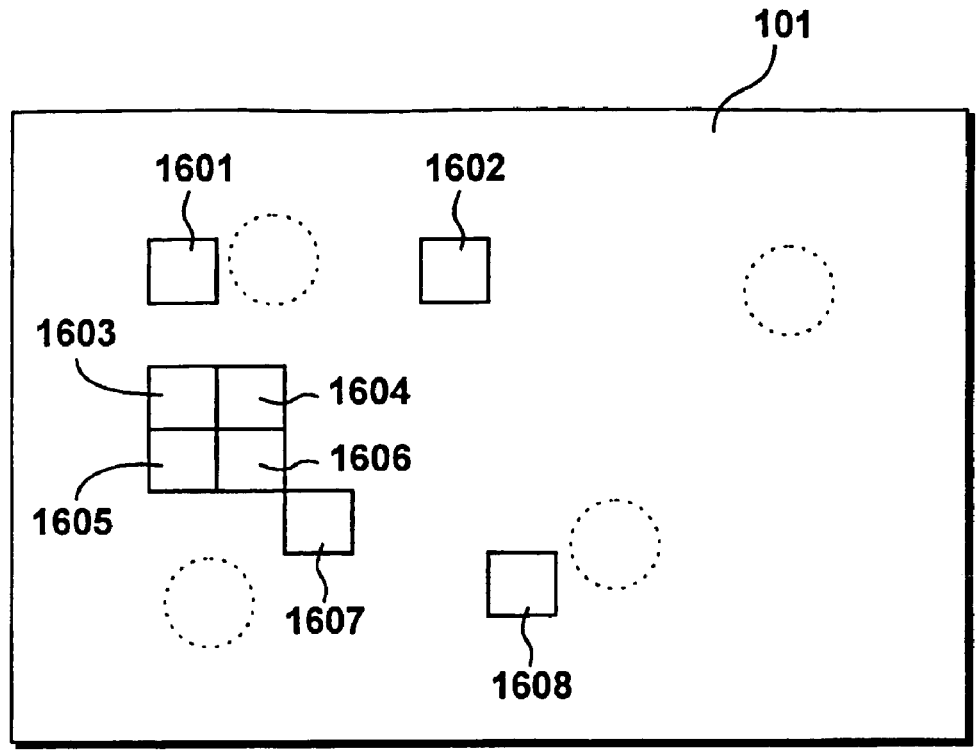
FIG. 16 illustrates the result of looking up candidate locations in an index shown in FIG. 7.
Figure 17:
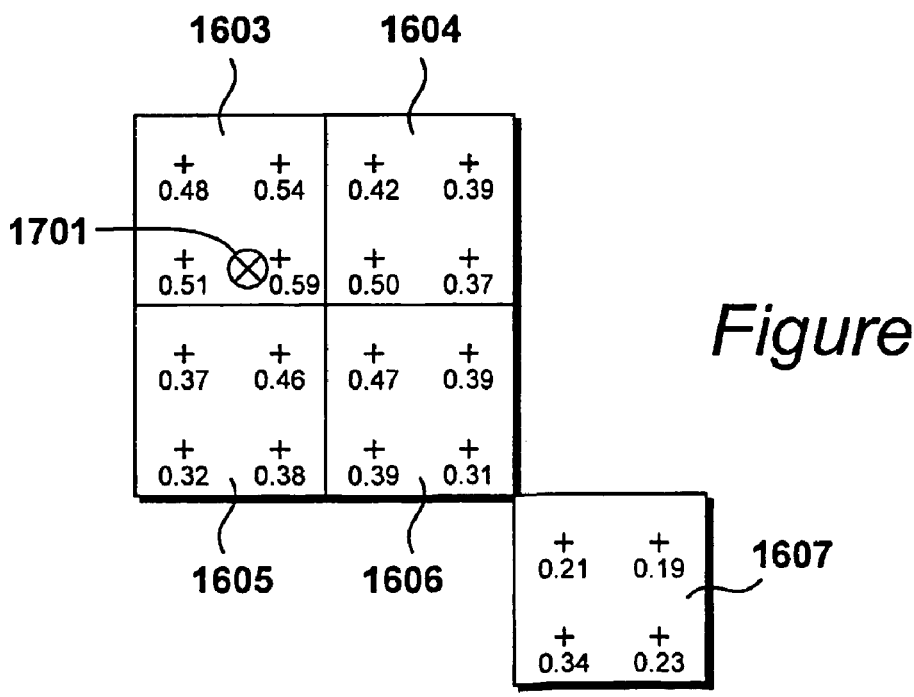
FIG. 17 illustrates the result of identifying highest scoring candidates shown in FIG. 7.

The result of the operation 702 of looking up candidate locations in the index is illustrated in FIG. 16. Eight location groups 1601 to 1608 have been identified, and their positions on the surface of the touch pad 101 are shown. These location groups are detailed in FIG. 17. Each location group contains four candidate locations. The highest scoring candidate locations, identified in operation 703, are likely to be those in close proximity to the location of the touch event. Similarity between the phase difference information 706 and profiles for the candidate locations is measured by a similarity score, or correlation, that is shown just below each of the candidate locations that are shown in FIG. 17. The true location of the touch event is shown at 1701. Calculation of the location of the touch event is done by a cubic spline interpolation in two dimensions, constructed according to the similarity scores. Iterative interpolation is then done to find the peak score to a fine level of resolution, resulting in a fractional offset between calibrated locations, as shown by the location of the touch event 1701.

Figure 18:
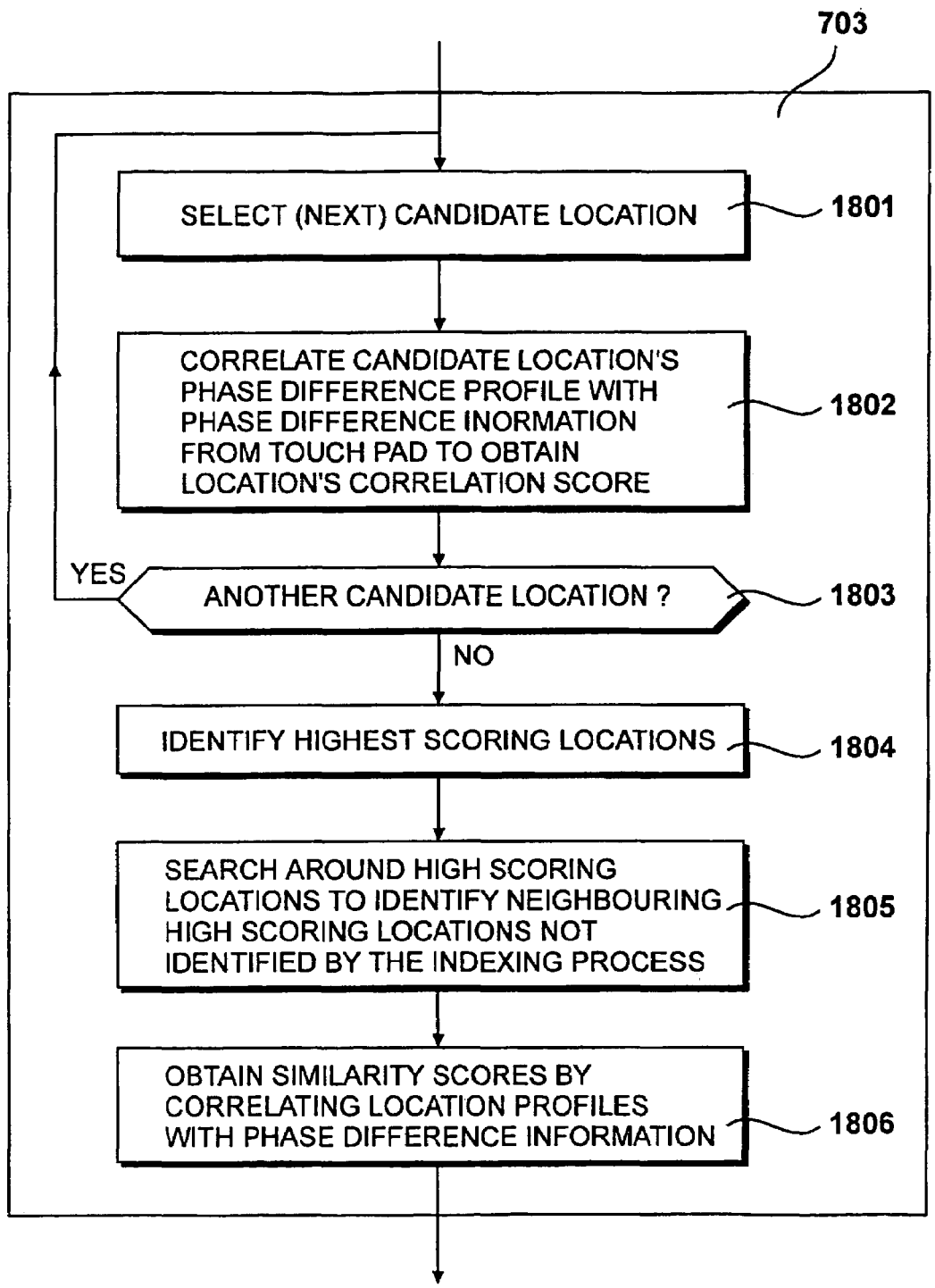
FIG. 18 details steps performed when performing the operation of identifying highest scoring candidates shown in FIG. 7, including steps of obtaining similarity scores.

The operation 703 of identifying the highest scoring candidate locations shown in FIG. 7 is detailed in FIG. 18. At step 1801 the first candidate location is selected. At step 1802 the candidate location's phase difference profile 1201 is correlated with the phase difference information 706 to obtain a correlation score for the candidate location. This correlation score is in the range −1 to +1. At step 1803 a question is asked as to whether another candidate location needs to be scored. If so, control is directed back to step 1801. Alternatively, once all thirty-two candidate locations have been scored, control is directed to step 1804, where the highest scoring candidate locations are identified. This reduces the number of candidate locations to twenty, as illustrated in FIG. 17. At step 1805 a search is performed around the highest scoring locations to see if any high scoring locations have been missed by the indexing process 702. At step 1806 similarity scores are obtained for the additional locations identified in step 1805.

Figure 19:
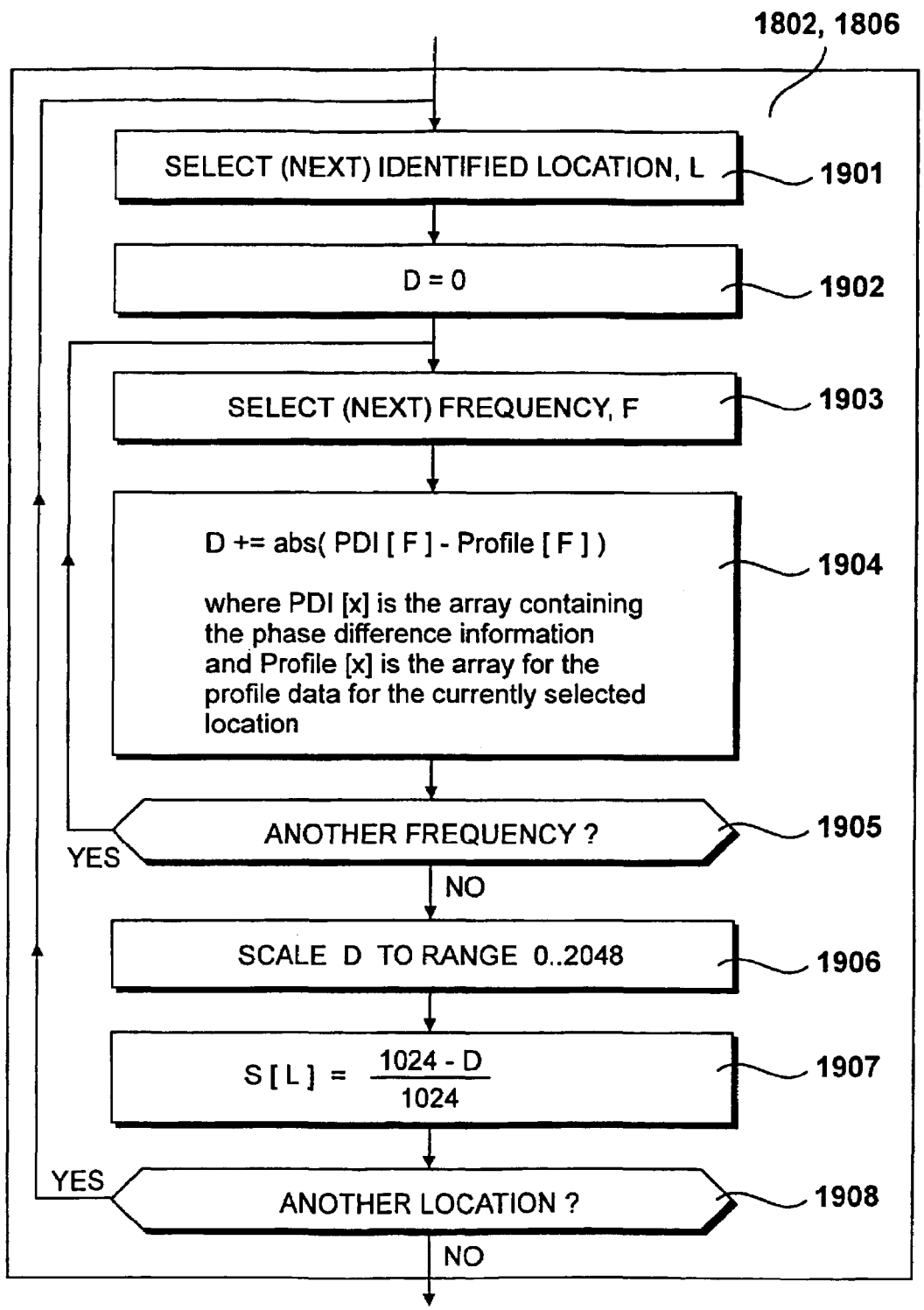
FIG. 19 details the steps of obtaining similarity scores shown in FIG. 18.

The steps 1802 and 1806 for correlating location profiles 1201, 1202, 1203 with phase difference information 706 are performed in the same way, as shown in the flowchart in FIG. 19. At step 1901 the next location is selected for correlation. At step 1902 a variable D is set to zero. At step 1903 the first frequency in the spectrum is selected. At step 1904 a calculation is made of the phase difference between the phase angles of the location profile and the phase difference location at the selected frequency. This phase difference is added to variable D. At step 1905 a question is asked as to whether another frequency is to be considered. Step 1904 is repeated for all 256 frequencies in the spectrum, resulting in a total accumulated phase difference, D, representative of the difference between the characteristics of the phase difference information 706 and the profile for the selected location. At steps 1906 and 1907 a correlation or similarity score S is calculated by re-ranging of the value D, and stored with respect to the selected location. The values shown at each location in FIG. 17, are the values calculated at step 1907. At step 1908 a question is asked as to whether another location is to be correlated. The steps of FIG. 19 are repeated for each location for which a similarity score is required.

The operations shown in FIG. 7 may be considered in the following way: Acoustic signals resulting from an acoustic interaction between an object and a surface are acquired at a plurality of locations 201, 202, 203 and 204 in the surface of the touch pad 101. Phase difference information 706 is extracted from digitised acoustic signals 1101, 1102. The acoustic interaction is then located in two dimensions of the touch pad surface by comparing 703 phase difference information 706 with a plurality of phase difference profiles 607 whose respective locations are known. In order to minimise the amount of processing required for comparing profiles 607 with phase difference information 706, the phase difference information 706 is first processed 702 with an index 606 to identify groups of candidate locations 1601 to 1608. The acoustic interaction is then located by processing of the phase difference information with phase difference profiles of the individual candidate locations.

Figure 20:
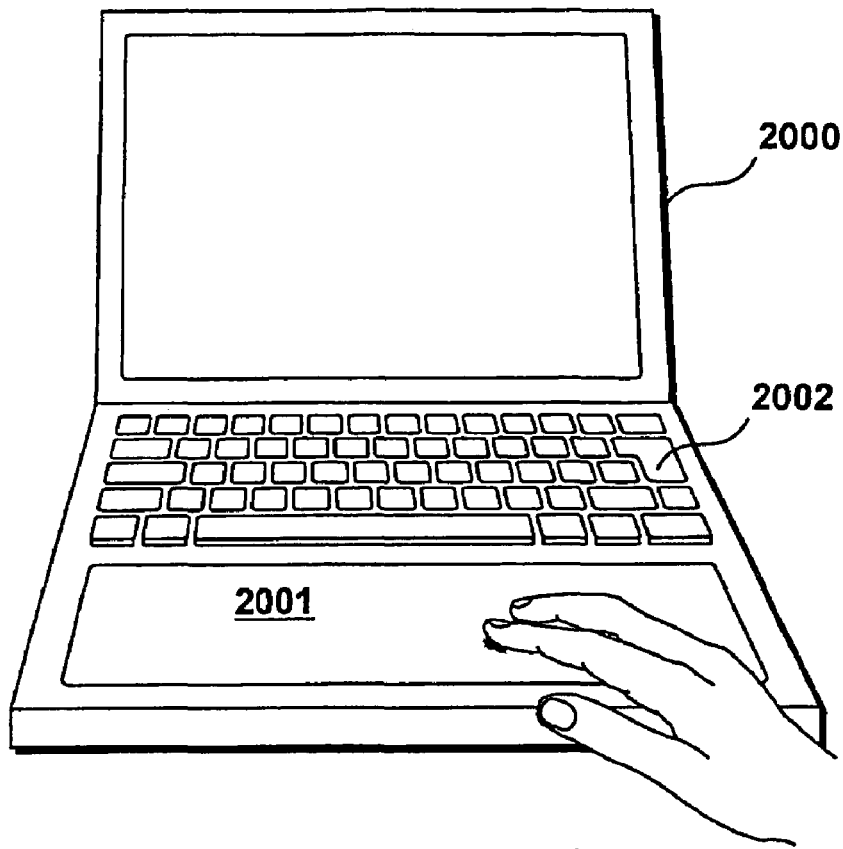
FIGS. 20 and 21 illustrate alternate embodiments of the invention.

The touch pad 101 shown in FIG. 1 is a stand-alone input device used to replace the mouse and achieve advantages of speed of use and reduction in operator stress. In an alternative embodiment, a touch pad according to the invention is provided in a laptop computer. This is illustrated in FIG. 20. The laptop computer 2000 has a large area acoustic touch pad 2001, taking up the entire width of the computer 2000. While typing on the keyboard 2002, the operator's wrists may rest upon the touch pad surface without false triggering of cursor movement or tap events. The touch pad driver only tracks localised points of friction noise or taps, and so the large indistinct areas of the wrist, or non-moving fingers, do not affect operation. Movement of the cursor on the screen is considerably eased, due to the large area over which finger movements may be made.

Figure 21:
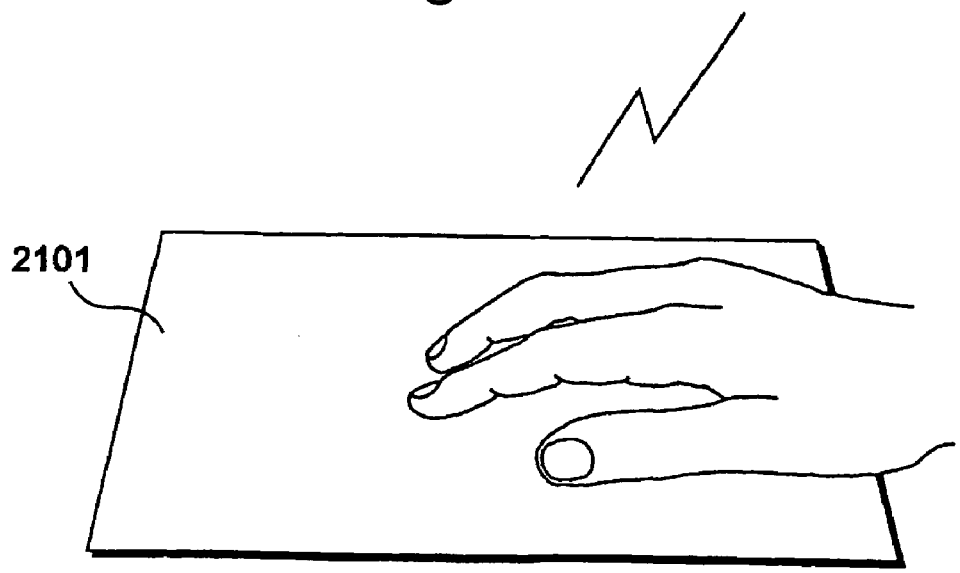

In a further alternative embodiment, illustrated in FIG. 21, an acoustic touch pad 2101 includes a digital radio link to a computer system. Analogue to digital conversion circuitry is included in the base of the touch pad, and the digitised acoustic signals are transmitted over the digital radio link to a computer system. In other embodiments, the two-dimensional surface of the acoustic touch pad is curved in a third dimension. The touch pad may be wrapped into curved shapes of any kind, including a sphere, the entire surface of which can be made touch-sensitive.

The calibration data 605 that is used by the driver instructions 604 includes profiles for each of several thousand locations on the surface 105 of the touch pad 101. Calibration data is generated by the operations shown in FIG. 22. At step 2201 location profiles 607 are recorded. At step 2202 a location index 606 is created by processing the recorded location profiles. Apparatus used to perform the profile recording operation 2201 is shown in FIG. 23. A transducer 2301 supplies random noise, similar to friction noise, to the surface 105 of the touch pad 101 at different locations. The transducer 2301 supplies sound to the surface via a pointed tip 2303. This simulates the effect of friction noise being generated continuously at a particular location. Each of the 2440 locations to be calibrated are supplied with random noise in this manner. Acoustic signals from the touch pad 101 are processed to generate calibration profiles 607 and an index 606.

Figure 22:
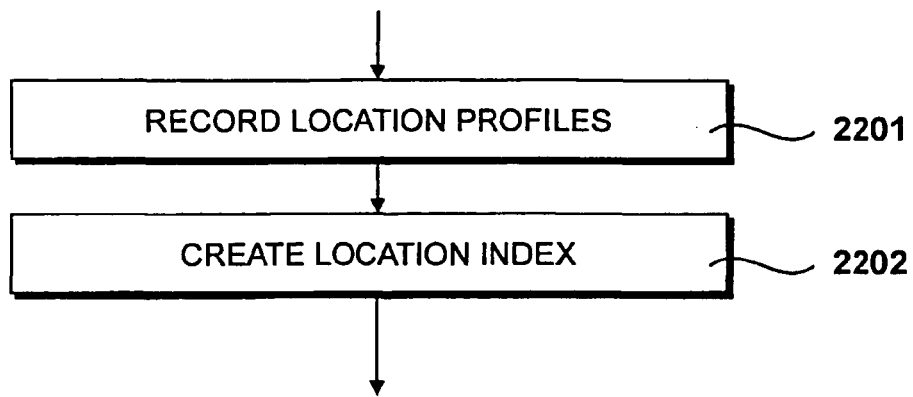
FIG. 22 summarises operations for creating the calibration data shown in FIG. 7, including a step of recording location profiles and a step of creating a location index.
Figure 23:
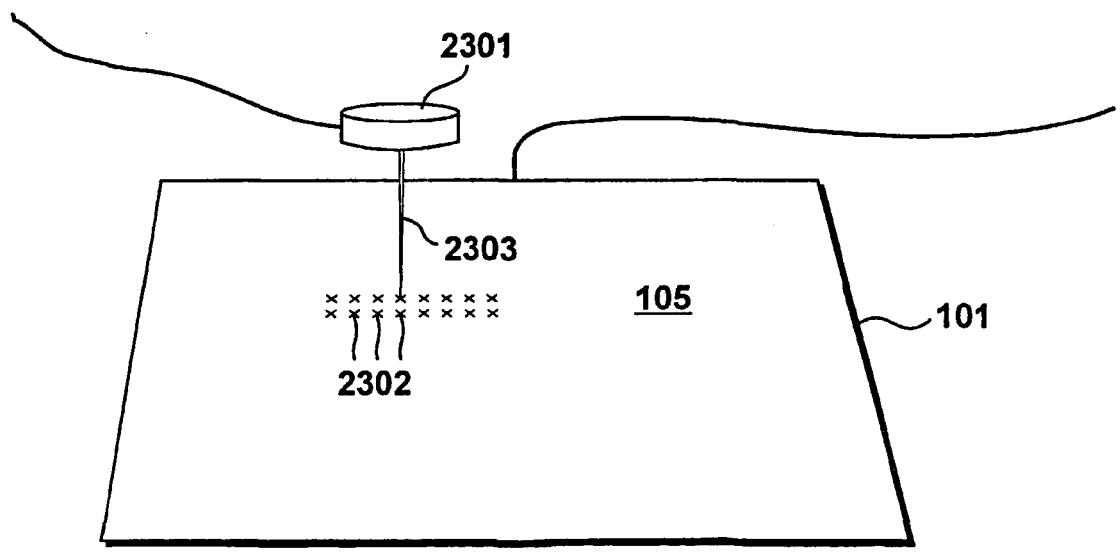
FIG. 23 details hardware used when calibrating the touch pad shown in FIG. 1.
Figure 24:
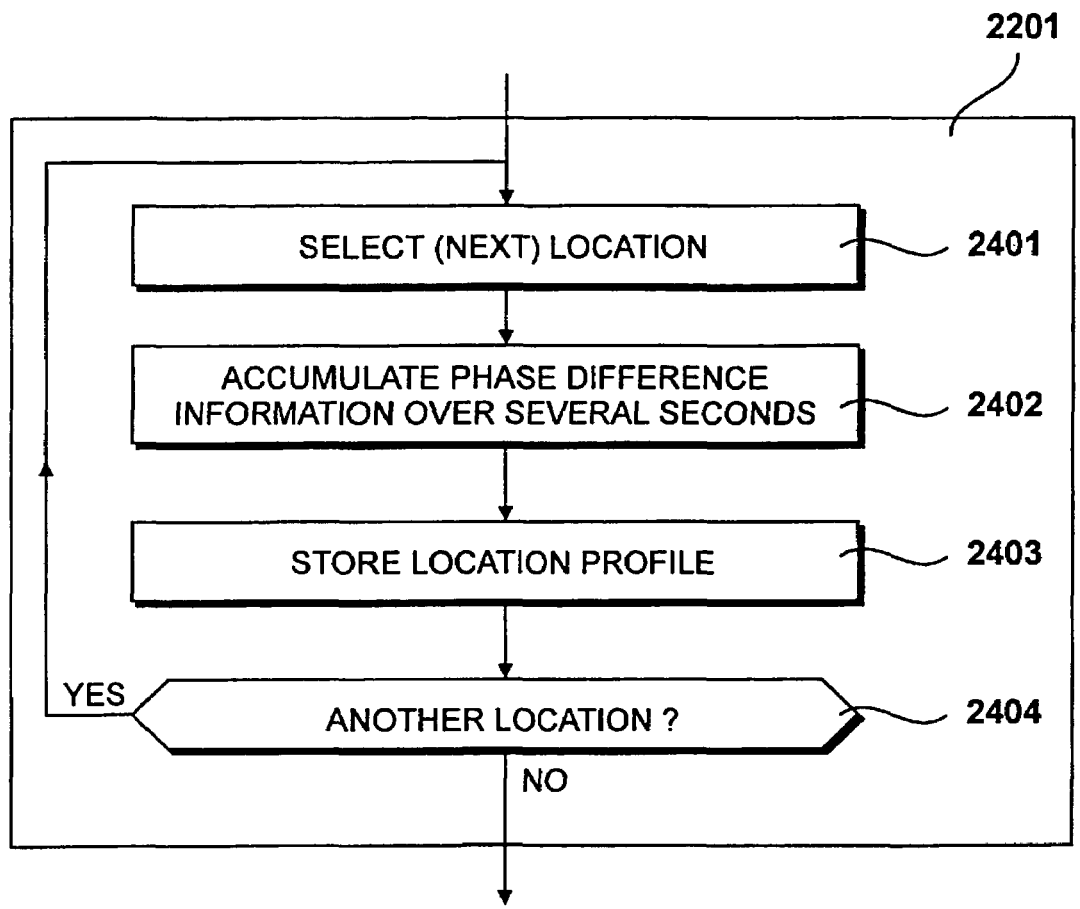
FIG. 24 details the step of recording location profiles shown in FIG. 22.

The operation 2201 of recording location profiles shown in FIG. 22 and illustrated in FIG. 23 is detailed in FIG. 24. At step 2401 the first location is selected. At this time, the random noise transducer 2301 is moved to the first location on the touch pad surface 105. At step 2402 phase difference information is recorded for several seconds. The phase difference angles, expressed as complex numbers, are accumulated. Once sufficient accumulation has taken place, the accumulated complex numbers are converted into phase angles. This accumulation process has the effect of recording the location profile with high precision, and with low noise. At step 2403 the location profile is stored as part of calibration data 605 for the touch pad 101. At step 2404 a question is asked as to whether another location is to be calibrated. The steps of FIG. 24 are repeated until all locations on the surface have been calibrated in this way.

Figure 25:
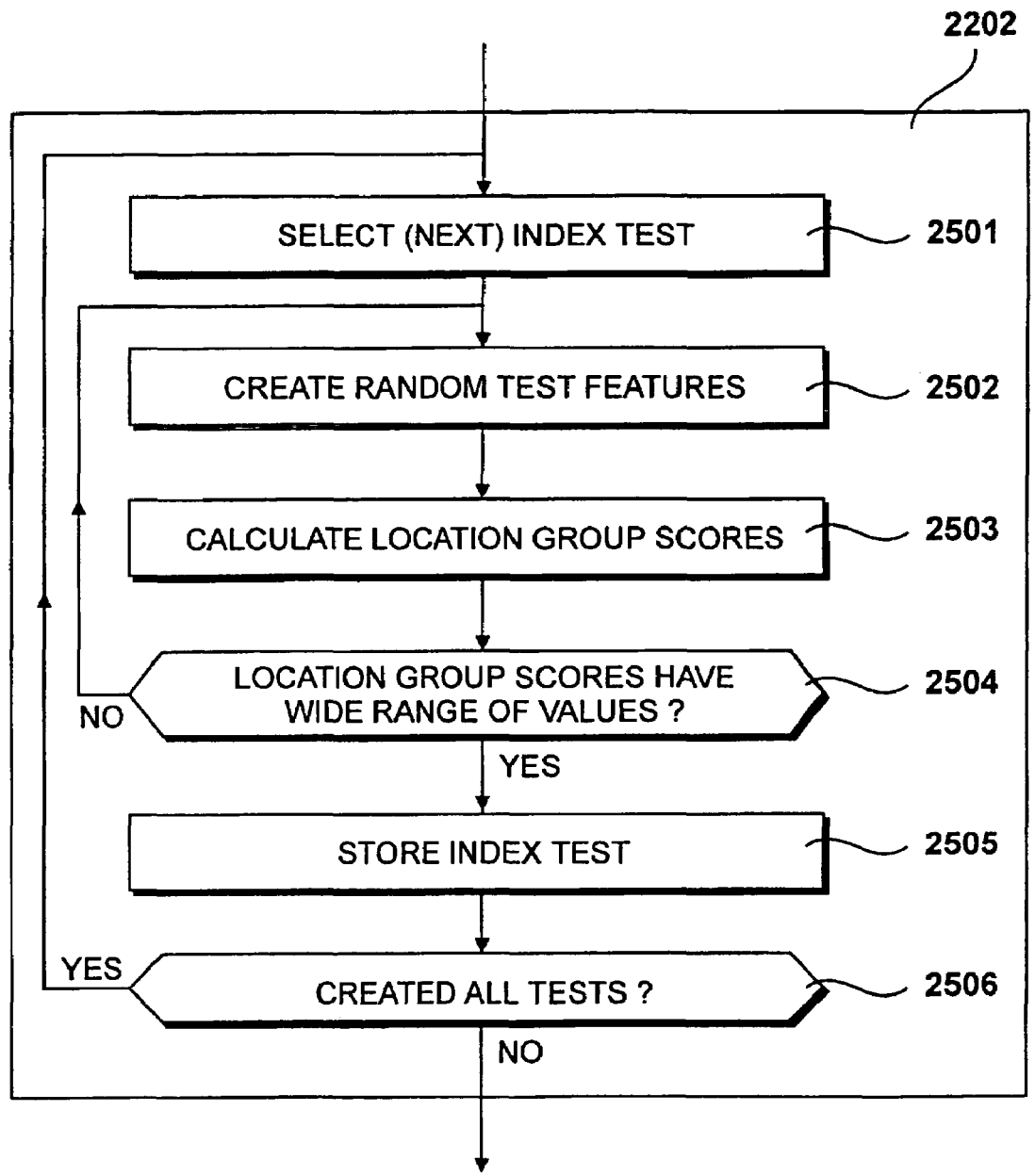
FIG. 25 details the step of creating a location index shown in FIG. 22.

The operation 2202 of creating a location index, shown in FIG. 22 is detailed in FIG. 25. At step 2501 the first of sixty-four index tests is selected. At step 2502 a set of random test features is created. This involves selecting a random frequency value 1307 and a random phase angle 1308 for each of the four test features 1304. At step 2503 location group scores are calculated for the set of features created at step 2502. The location group scores are calculated by the steps shown in FIG. 15 applied to each of the locations in the group, resulting in four values for score S, which are then averaged to produce a single value for S for each location group. There are 610 location groups, and 610 score values are generated in step 2503. At step 2504 a question is asked as to whether the location group scores have a wide range of values. The 610 scores generated at step 2503 are analysed to see whether their range is high or not. A wide range of scores indicates that the features generated at step 2502 have a strong ability to differentiate between location profiles, which is a required characteristic. If the range of values is not sufficiently high, control is directed to step 2502 and a different set of test features is created. Alternatively, the index test, including features 1304 and group scores 1305, is stored at 2505. At step 2506 a question is asked as to whether all sixty-four index tests have been created. If not, control is directed to step 2501. Alternatively, all tests have been created, and the index 606 is complete. Steps 2502, 2593 and 2504 may be considered as having the effect of classifying locations in terms of the similarity of their respective location-related profiles.

What is claimed is:

1. A touch pad for acquiring acoustic signals resulting from touch events, comprising:
   a surface having an area in which said touch events may be formed;
   a plurality of transducers for acquiring said acoustic signals at a plurality of different locations in said surface;
   an output for supplying representations of said acoustic signals to an analog to digital converter; and
   an arrangement for electrically combining said acoustic signals from a plurality of said different locations into a combined signal for said output, said arrangement including connections for connecting together a plurality of said transducers in antiphase so as to electrically combine preferred components of said acoustic signals and a resistance connected in parallel with an intrinsic capacitance of at least one of said transducers to form a high pass filter that emphasizes said preferred components.

2. A touch pad according to claim 1, including a signal conditioner arranged to emphasize preferred components of said acoustic signals.

3. A touch pad according to claim 1, wherein signals from a plurality of said transducers are electrically combined by connecting said plurality of transducers in series.

4. A touch pad according to claim 1, wherein signals from a plurality of said transducers are electrically combined by connecting said plurality of transducers in parallel.

5. A touch pad according to claim 1, wherein a pair of said transducers whose signals are combined are located diagonally relative to said surface.

6. An input control device for inputting data into a computer system, comprising:
   a surface for receiving touch events and generating acoustic signals from a said touch event, and
   a transducer arrangement for acquiring said acoustic signals at a plurality of different locations in said surface;
   an analog to digital converter for digitizing representations of said acoustic signals;
   a processor for processing said digitized acoustic signals;
   an instruction storage device for storing instructions for said processor such that said instructions stored in said instruction storage device include instruction code sequences executable on said processor to perform the steps of:
      (a) acquiring digitized acoustic signals from said analog to digital converter;
      (b) extracting phase difference information from a pair of said digitized acoustic signals;
      (c) locating a said touch event by processing said phase difference information with reference to a calibrated relationship between said phase difference information and respective known locations; and
      (d) supplying input signals to said computer system in response to the location of a said touch event;
   a data storage device for storing intermediate data generated by said processor; and
   a calibration storage device for storing calibration data associated with said surface.

7. An input control device according to claim 6, wherein said processor is part of said computer system.

8. A input control device according to claim 6, wherein said transducer arrangement includes a plurality of said transducers which are connected together in antiphase.

9. A method for acquiring and processing acoustic signals arising from an acoustic interaction between an object and a surface, the method comprising the operations of:
   (a) acquiring the said acoustic signals at a plurality of locations in said surface;
   (b) extracting phase difference information from said acoustic signals; and
   (c) locating the said acoustic interaction on the basis of comparisons between said phase difference information and a plurality of phase difference profiles whose respective locations are known, wherein said operation (c) includes the sub-operations of:
      (c1) processing said phase difference information with an index to identify candidate locations; and
      (c2) locating the said acoustic interaction by further processing of said phase difference information with chase difference profiles associated with said candidate locations.

10. A method according to claim 9, wherein the location of said acoustic interaction is defined by interpolating between locations of known phase difference profiles.

11. A method according to claim 9, including updating a cursor location parameter in a graphical user interface in response to an incrementally detected change in the location of said object.

12. A method according to claim 9, wherein said acoustic interaction between an object and a surface is a continuous frictional interaction.

13. A method according to claim 9, including electrically combining acoustic signals from a plurality of respective locations in said surface.

14. A method according to claim 13, wherein said acoustic signals are combined in antiphase.

15. A method for navigating a graphical user interface in response to acoustic signals generated by a acoustic interaction between a finger and a surface, the method comprising the operations of:
   (a) acquiring the said acoustic signals at a plurality of locations in said surface;
   (b) extracting phase difference information from a pair of said acoustic signals;
   (c) locating the said acoustic interaction by processing said phase difference information with reference to a calibrated relationship between phase difference characteristics and respective locations; and
   (d) updating said graphical user interface in response to the location of said acoustic interaction.

16. A method for calibrating an acoustic touch pad by acquiring and processing acoustic signals resulting from sound supplied to said touch pad at selected locations on the surface of said touch pad; the method comprising repeated operations of:
   (a) selecting a location for calibration;
   (b) supplying a sound to said surface at said selected location;
   (c) acquiring the said acoustic signals from a plurality of transducers in said surface;
   (d) extracting a location-related profile from said acoustic signals; and
   (e) storing said location-related profile in association with said selected location; and
   the repeated operations of:
   (f1) classifying locations in terms of the similarity of their respective location-related profiles; and
   (f2) generating an index entry from which candidate locations can be identified in response to location-related information.

17. A computer readable medium having computer program instructions encoded upon it for causing a computer to execute the method of claim 16.

18. A computer readable medium having computer program instructions encoded upon it for processing acoustic signals resulting from user touch events formed on the surface of a touch pad by executing the steps of:
   (a) acquiring digitized forms of said acoustic signals from an analog to digital converter;
   (b) extracting phase difference information from a pair of said digitized acoustic signals; and
   (c) locating a said user touch event in two-dimensions of said surface by processing said phase difference information with reference to a calibrated relationship between said phase difference information and respective known locations.

19. A computer readable medium according to claim 18 wherein said step (c) includes:
   (c1) processing said phase difference information with an index to identify candidate locations; and
   (c2) locating a said user touch event in two-dimensions of said surface by further processing of said phase difference information with phase difference profiles associated with said candidate locations.

20. A computer readable medium according to claim 18 wherein said computer readable medium has a data structure encoded upon it that represents calibration data for an acoustic touch pad;

wherein said step includes:
- (c1) processing said phase difference information with an index to identify candidate locations; and
- (c2) locating a said user touch event in two-dimensions of said surface by further processing of said phase difference information with phase difference profiles associated with said candidate locations; and said data structure defining:
- (a) relationships between location-related profiles and respective known locations on said touch pad; and
- (b) an index for candidate locations.

* * * * *